(12) United States Patent
Mizukura et al.

(10) Patent No.: US 8,704,846 B2
(45) Date of Patent: Apr. 22, 2014

(54) INFORMATION PROCESSING DEVICE AND METHOD, PROGRAM, AND INFORMATION PROCESSING SYSTEM

(75) Inventors: Takami Mizukura, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 1138 days.

(21) Appl. No.: 12/316,382

(22) Filed: Dec. 10, 2008

(65) Prior Publication Data
US 2009/0154803 A1    Jun. 18, 2009

(30) Foreign Application Priority Data

Dec. 13, 2007  (JP) ............................... P2007-321583

(51) Int. Cl.
| | |
|---|---|
| G09G 5/02 | (2006.01) |
| G03F 5/08 | (2006.01) |
| G06K 9/00 | (2006.01) |

(52) U.S. Cl.
USPC ........... 345/590; 345/589; 345/593; 345/600; 345/604; 358/518; 382/167

(58) Field of Classification Search
None
See application file for complete search history.

(56) References Cited

U.S. PATENT DOCUMENTS

| | | | |
|---|---|---|---|
| 5,933,253 | A | 8/1999 | Ito et al. |
| 5,987,165 | A * | 11/1999 | Matsuzaki et al. ............ 382/162 |
| 6,301,383 | B1 | 10/2001 | Ito et al. |
| 6,437,792 | B1 | 8/2002 | Ito et al. |
| 6,560,356 | B1 * | 5/2003 | Takahashi et al. ............ 382/162 |
| 6,628,822 | B1 | 9/2003 | Nakabayashi et al. |
| 6,882,445 | B1 | 4/2005 | Takahashi et al. |
| 7,177,465 | B1 * | 2/2007 | Takahira ....................... 382/166 |
| 2006/0170940 | A1 * | 8/2006 | Kang et al. .................... 358/1.9 |
| 2009/0310154 | A1 * | 12/2009 | Morovic et al. ............... 358/1.9 |

FOREIGN PATENT DOCUMENTS

| | | |
|---|---|---|
| JP | 5-298437 A | 11/1993 |
| JP | 07-236069 A | 9/1995 |
| JP | 09-098298 A | 4/1997 |
| JP | 9-135360 A | 5/1997 |
| JP | 10-084487 A | 3/1998 |
| JP | 11-032228 A | 2/1999 |
| JP | 2000-278546 A | 10/2000 |
| JP | 2000-354171 A | 12/2000 |
| JP | 2003-323609 A | 11/2003 |
| JP | 2005-311805 A | 11/2005 |
| JP | 2005-354228 A | 12/2005 |
| JP | 2006-311447 A | 11/2006 |
| JP | 2007-142494 A | 6/2007 |
| WO | WO-99/55074 | 10/1999 |

* cited by examiner

*Primary Examiner* — Tize Ma
(74) *Attorney, Agent, or Firm* — Lerner, David, Littenberg, Krumholz & Mentlik, LLP

(57) ABSTRACT

An information processing device, configured to perform color gamut conversion for compressing or enlarging the color gamut of image data, includes: a selecting unit configured to select a plurality of coordinate movement directions to be synthesized for determining the coordinate movement destination of a pixel to be processed during the color gamut conversion; a coordinate moving unit configured to move the coordinates of the pixel to be processed in each of the selected plurality of directions; and a synthesizing unit configured to synthesize coordinate movement in the selected plurality of directions.

1 Claim, 27 Drawing Sheets

| INDEX | 0 | 1 | 2 | 3 | 4 |
|---|---|---|---|---|---|
| COLOR GAMUT INFORMATION TO BE IMPLICATED | sRGB | Adobe RGB | Wide RGB | ROMM RGB | DCI |

| CASE OF sRGB | X | Y |
|---|---|---|
| RED | 0.6400 | 0.3300 |
| GREEN | 0.3000 | 0.6000 |
| BLUE | 0.1500 | 0.0600 |
| WHITE POINT | 0.3127 | 0.3290 |

| REPRESENTATIVE COLOR | Y | C | H |
|---|---|---|---|
| MAGENTA | 0.412 | 0.532 | 52 |
| RED | 0.300 | 0.525 | 108 |
| YELLOW | 0.885 | 0.505 | 171 |
| GREEN | 0.588 | 0.532 | 232 |
| CYAN | 0.699 | 0.525 | 288 |
| BLUE | 0.115 | 0.506 | 351 |

| REPRESENTATIVE COLOR | Y | Cb | Cr |
|---|---|---|---|
| MAGENTA | 0.412 | 0.328 | 0.419 |
| RED | 0.300 | −0.162 | 0.499 |
| YELLOW | 0.885 | −0.499 | 0.079 |
| GREEN | 0.588 | −0.328 | −0.419 |
| CYAN | 0.699 | 0.162 | −0.499 |
| BLUE | 0.115 | 0.499 | −0.079 |

| H | Y | C |
|---|---|---|
| 0 | 0.159 | 0.474 |
| 1 | 0.168 | 0.470 |
| 2 | 0.172 | 0.467 |
| 3 | 0.177 | 0.465 |
| 4 | 0.182 | 0.463 |
| 5 | 0.187 | 0.461 |
| ⋮ | ⋮ | ⋮ |
| 354 | 0.132 | 0.493 |
| 356 | 0.142 | 0.485 |
| 357 | 0.148 | 0.482 |
| 358 | 0.153 | 0.479 |
| 359 | 0.156 | 0.476 |
| 360 | 0.159 | 0.474 |

| H | Y | C | H |
|---|---|---|---|
| 0 | 0.159 | 0.474 | 0.000 |
| 1 | 0.168 | 0.470 | 0.008 |
| 2 | 0.172 | 0.467 | 0.016 |
| 3 | 0.177 | 0.465 | 0.024 |
| 4 | 0.182 | 0.463 | 0.032 |
| 5 | 0.187 | 0.461 | 0.040 |
| ⋮ | ⋮ | ⋮ | ⋮ |
| 355 | 0.137 | 0.487 | −0.043 |
| 356 | 0.142 | 0.485 | −0.034 |
| 357 | 0.148 | 0.482 | −0.025 |
| 358 | 0.153 | 0.479 | −0.017 |
| 359 | 0.156 | 0.476 | −0.008 |
| 360 | 0.159 | 0.474 | 0.000 |

FIG. 20
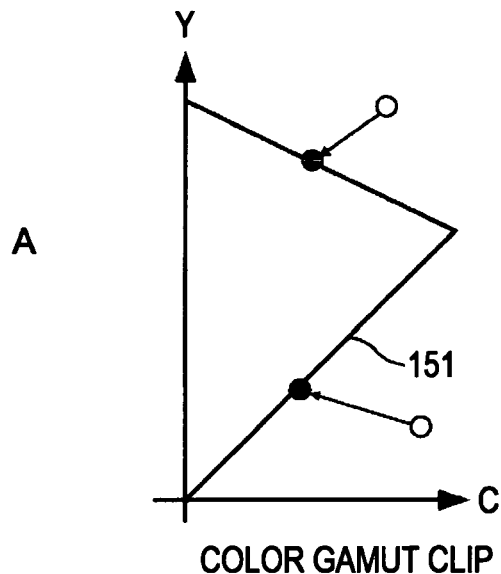
A
COLOR GAMUT CLIP
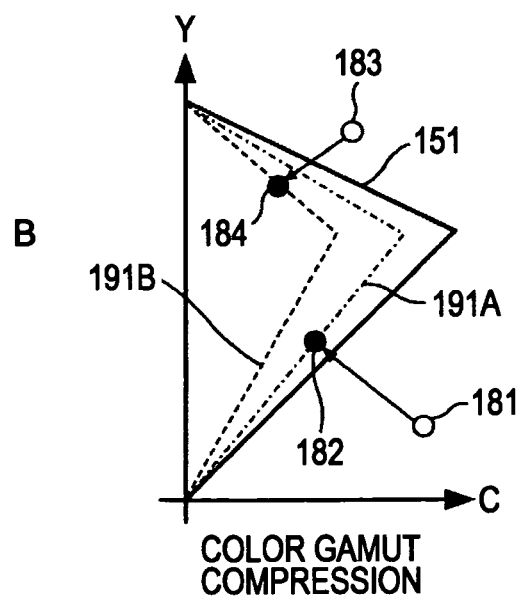
B
COLOR GAMUT COMPRESSION

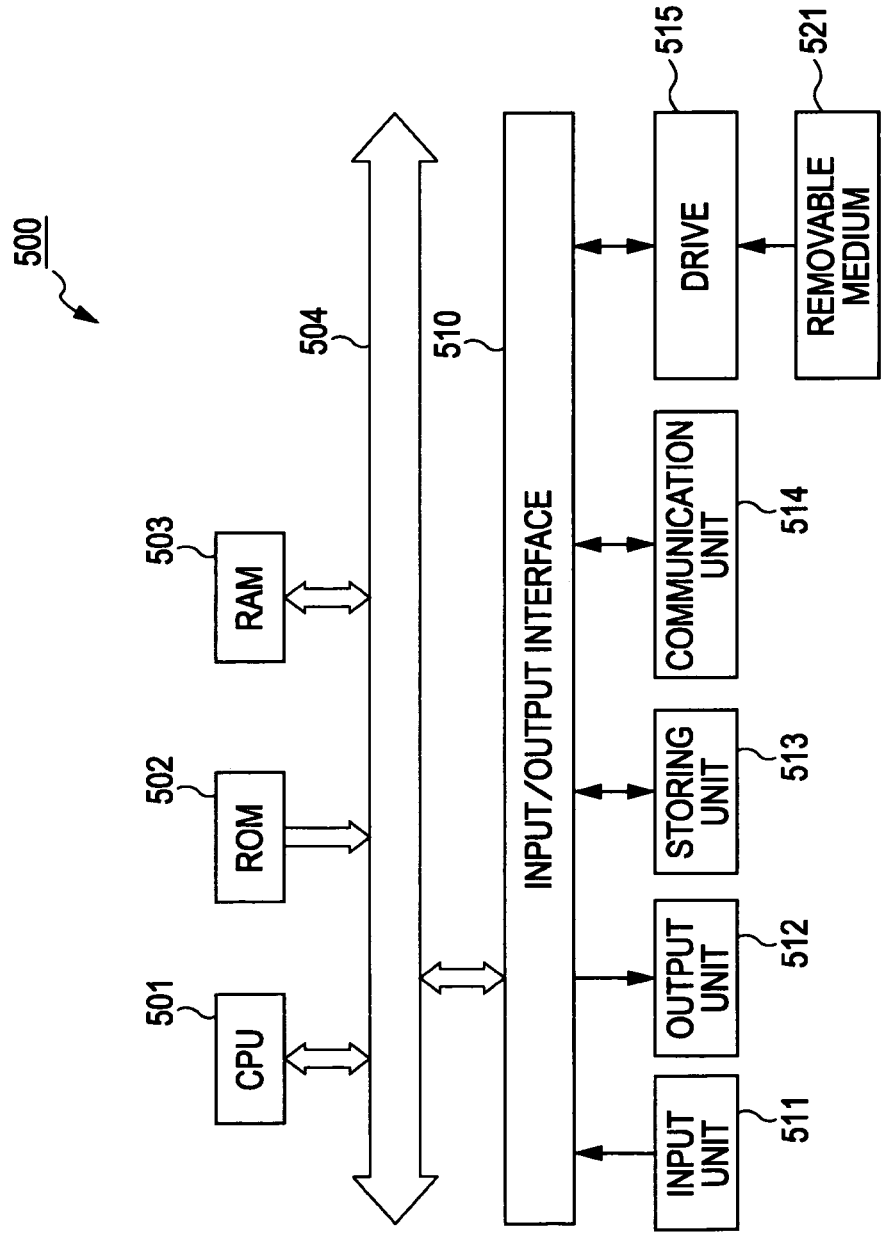

INFORMATION PROCESSING DEVICE AND METHOD, PROGRAM, AND INFORMATION PROCESSING SYSTEM

CROSS REFERENCES TO RELATED APPLICATIONS

The present invention application claims priority from Japanese Patent Application No. JP 2007-321583, filed in the Japanese Patent Office on Dec. 13, 2007, the entire content of which is incorporated herein by reference.

BACKGROUND OF THE INVENTION

1. Field of the Invention

The present invention relates to an information processing device and method, program, and information processing system, and particularly relates to an information processing device and method, program, and information processing system whereby mapping direction control can be realized in a more flexible manner, with color gamut conversion.

2. Description of the Related Art

Upon image data being exchanged between devices of which the color expression regions differ, there is a possibility that out of color registration, or hue shift of a high-luminance/high-saturation portion occurs. Therefore, heretofore, in order to solve such out of color registration between devices, color mapping (color gamut conversion), such as compression or enlargement of a color gamut, has been proposed.

SUMMARY OF THE INVENTION

Color gamut conversion is performed by moving (mapping) the coordinates of a pixel to be processed within color space. Heretofore, with regard to this mapping method, various mapping methods have been proposed.

For example, with the color gamut compression method disclosed in International Publication WO 1999/055074 (U.S. Pat. No. 6,560,356), in the case of compressing the color gamut of a pixel to be processed existing in a certain hue, one appropriate convergent point is fixed for each hue, for example, such that a direction destination (convergent point) of color gamut compression is set to one point on the Y axis having the luminance of the maximum saturation point (Cusp point) of an output device color gamut 10 such as shown in FIG. 1, thereby performing compression so as to prevent a tone jump which breaks tone continuity from occurrence.

In general, a direction such as shown in FIG. 2 is common as an ideal mapping direction of color gamut compression. A high luminance color or low luminance color is compressed toward a direction where saturation is compressed as much as possible, i.e., a direction where the color is eliminated, and a color around the Cusp point is compressed toward a direction where the color is somewhat moved to a luminance direction so as to be remained, whereby the appearance of the compression results becomes natural.

Such a compression direction can be realized by employing a method for referencing a 3DLUT table, or the like.

However, with the method disclosed in International Publication WO 1999/055074, there is employed one convergent point for each hue, so there has been a possibility of difficulty in controlling a mapping direction in accordance with luminance and saturation subjectively.

There has been recognized demand to enable mapping direction control to be realized in a more flexible manner by blending multiple mapping directions which mutually differ with an appropriate ratio to determine a final mapping direction with color gamut conversion, and consequently, enable to a suitable mapping direction to be readily realized depending on any purpose.

According to an embodiment of the present invention, an information processing device configured to perform color gamut conversion for compressing or enlarging the color gamut of image data, includes: a selecting unit configured to select multiple coordinate movement directions to be synthesized for determining the coordinate movement destination of a pixel to be processed during the color gamut conversion; a coordinate moving unit configured to move the coordinates of the pixel to be processed in each of the selected multiple directions; and a synthesizing unit configured to synthesize coordinate movement in the selected multiple directions.

The coordinate moving unit may move the coordinates of the pixel to be processed in a saturation direction.

The coordinate moving unit may move the pixel to be processed in a rectilinear direction which connects a point, which is disposed on a luminance axis, having the same luminance value as that of the maximum saturation point, and the pixel to be processed.

The coordinate moving unit may move the pixel to be processed in a rectilinear direction which connects a black point and the pixel to be processed in a case wherein the luminance of the pixel to be processed is brighter than the luminance of the maximum saturation point, and move the pixel to be processed in a rectilinear direction which connects a white point and the pixel to be processed in a case wherein the luminance of the pixel to be processed is darker than the luminance of the maximum saturation point.

The selecting unit may select the multiple coordinate movement directions based on regarding whether or not color enlargement processing for enlarging a color gamut is performed as the color gamut conversion.

The selecting unit may select a saturation direction, and a rectilinear direction which connects a black point or white point and the pixel to be processed as the coordinate movement directions in a case wherein the color gamut enlargement processing is not performed, and select a saturation direction, and a rectilinear direction which connects a point, which is disposed on a luminance axis, having the same luminance value as that of the maximum saturation point, and the pixel to be processed as the coordinate movement directions in a case wherein the color gamut enlargement processing is performed.

The synthesizing unit may synthesize coordinate movement performed in the selected multiple directions with a ratio based on a blend function.

According to an embodiment of the present invention, an information processing method, which is a color gamut conversion method for compressing or enlarging the color gamut of image data, includes the steps of: selecting a plurality of coordinate movement directions to be synthesized for determining the coordinate movement destination of a pixel to be processed during the color gamut conversion; moving the coordinates of the pixel to be processed in each of the selected plurality of directions; and synthesizing coordinate movement in the selected plurality of directions.

According to an embodiment of the present invention, a program causing a computer to execute a color gamut conversion method for compressing or enlarging the color gamut of image data, the color gamut conversion method includes the steps of: selecting multiple coordinate movement directions to be synthesized for determining the coordinate movement destination of a pixel to be processed during the color gamut conversion; moving the coordinates of the pixel to be processed in each of the selected multiple directions; and synthesizing coordinate movement in the selected multiple directions.

According to the above configuration, multiple coordinate movement directions to be synthesized for determining the coordinate movement destination of a pixel to be processed during the color gamut conversion are selected, the coordinates of the pixel to be processed is moved in each of the selected multiple directions, and coordinate movement performed in the selected multiple directions are synthesized.

According to an embodiment of the present invention, an information processing system in which a supply-side device transmits image data to an obtaining-side device, and performs color gamut conversion for compressing or enlarging the color gamut of the image data, the supply-side device includes a supplying unit configured to supply the image data to the obtaining-side device, and the obtaining-side device includes an obtaining unit configured to obtain the image data supplied from the supply-side device, a selecting unit configured to select multiple coordinate movement directions to be synthesized for determining the coordinate movement destination of a pixel to be processed during the color gamut conversion as to the obtained image data, a coordinate moving unit configured to move the coordinates of the pixel to be processed in each of the selected multiple directions, and a synthesizing unit configured to synthesize coordinate movement in the selected multiple directions.

According to the above configuration, with an information processing system in which a supply-side device transmits image data to an obtaining-side device, and performs color gamut conversion for compressing or enlarging the color gamut of the image data, with the supply-side device, the image data is supplied to the obtaining-side device, and with the obtaining-side device, the image data supplied from the supply-side device is obtained, multiple coordinate movement directions to be synthesized for determining the coordinate movement destination of a pixel to be processed during the color gamut conversion as to the obtained image data are selected, the coordinates of the pixel to be processed are moved in each of the selected multiple directions, and coordinate movement performed in the selected multiple directions is synthesized.

According to an embodiment of the present invention, an information processing system in which a supply-side device transmits image data to an obtaining-side device, and performs color gamut conversion for compressing or enlarging the color gamut of the image data, the supply-side device includes a selecting unit configured to select multiple coordinate movement directions to be synthesized for determining the coordinate movement destination of a pixel to be processed during the color gamut conversion as to the obtained image data, a coordinate moving unit configured to move the coordinates of the pixel to be processed in each of the selected multiple directions, a synthesizing unit configured to synthesize coordinate movement in the selected multiple directions, and a supplying unit configured to supply the image data of which the coordinates are moved in the direction where the multiple directions are synthesized, subjected to the color gamut conversion, to the obtaining-side device, and the obtaining-side device includes an obtaining unit configured to obtain the image data subjected to the color gamut conversion, supplied from the supply-side device.

According to the above configuration, with an information processing system in which a supply-side device transmits image data to an obtaining-side device, and performs color gamut conversion for compressing or enlarging the color gamut of the image data, with the supply-side device, multiple coordinate movement directions to be synthesized for determining the coordinate movement destination of a pixel to be processed during the color gamut conversion as to the image data are selected, the coordinates of the pixel to be processed are moved in each of the selected multiple directions, coordinate movement performed in the selected multiple directions are synthesized, and the image data of which the coordinates are moved in the direction where the multiple directions are synthesized, subjected to the color gamut conversion, is supplied to the obtaining-side device, and with the obtaining-side device, the image data subjected to the color gamut conversion, supplied from the supply-side device is obtained.

The term "network" as used here means an arrangement wherein at least two devices are connected, whereby transmission of information can be performed from a certain device to the other device. The devices which communicate through the network may be separate devices, or may be internal blocks making up one device.

Also, the term "communication" may include not only wireless communication and cable communication but also communication wherein wireless communication and cable communication are mixed, i.e., wireless communication is performed within a certain section, and cable communication is performed within another section. Further, an arrangement may be made wherein communication from a certain device to the other device is performed by cable communication, and communication from the other device to a certain device is performed by wireless communication.

According to embodiments of the present invention, color gamut conversion can be performed. Particularly, a more suitable mapping direction can be readily realized according to a purpose.

BRIEF DESCRIPTION OF THE DRAWINGS

FIG. 6 is a schematic view illustrating a format example of color gamut information;

FIG. 7 is a schematic view illustrating another format example of color gamut information;

FIGS. 9A and 9B are schematic views illustrating yet another format example of color gamut information;

FIGS. 10A and 10B are schematic views illustrating yet another format example of color gamut information;

FIG. 20 is a schematic view wherein a color gamut clip situation and a color gamut compression situation are compared;

FIG. 32 is a block diagram illustrating a configuration example of a personal computer to which an embodiment of the present invention has been applied.

DESCRIPTION OF THE PREFERRED EMBODIMENTS

Figure 3:
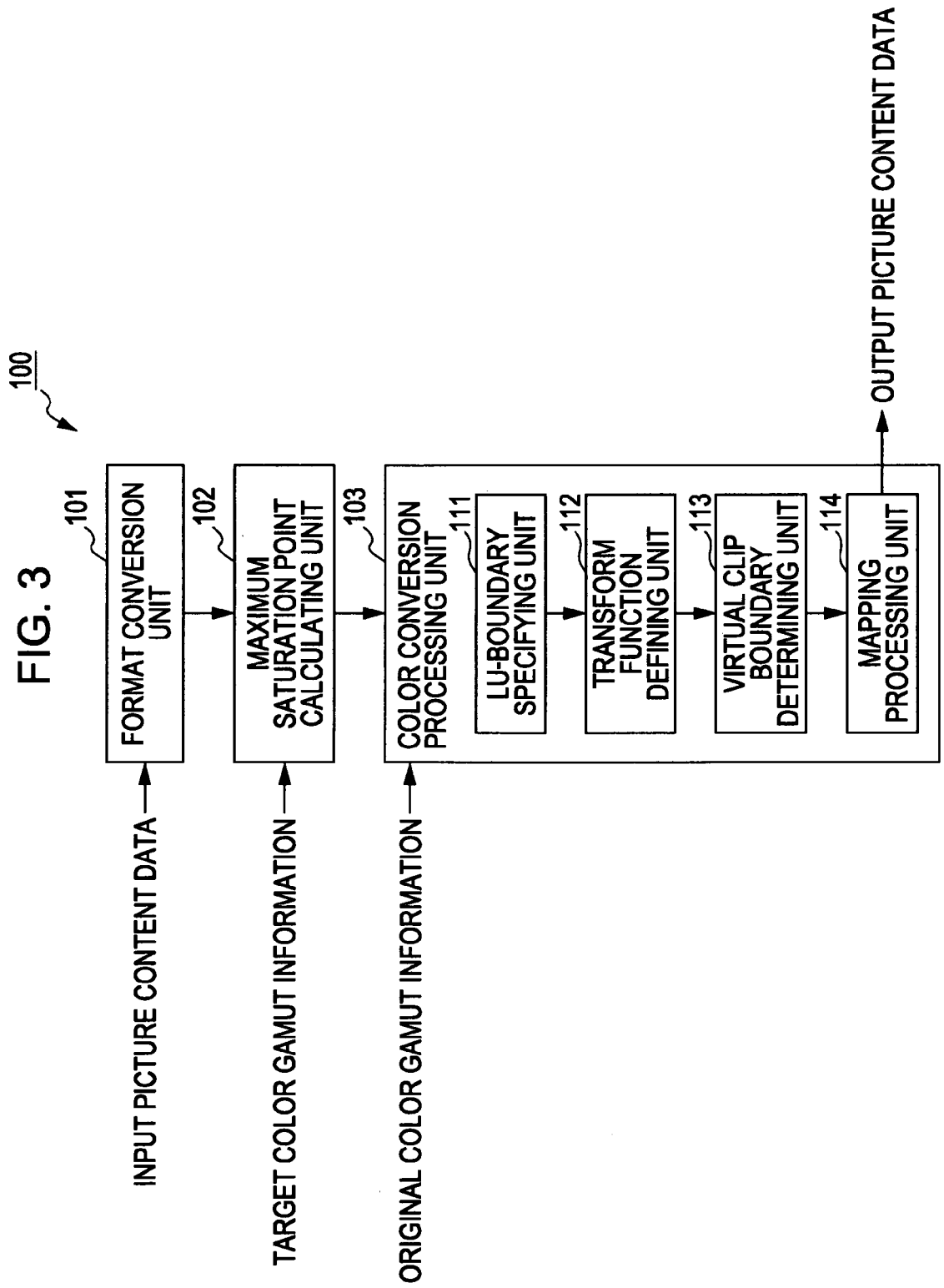
FIG. 3 is a block diagram illustrating a configuration example of a color gamut conversion device to which an embodiment of the present invention has been applied.

FIG. 3 is a block diagram illustrating a principal configuration example of a color gamut conversion device to which an embodiment of the present invention has been applied.

A color gamut conversion device 100 shown in FIG. 3 is an information processing device wherein the color gamut of input picture content data is converted based on original color gamut information and target color gamut information, thereby obtaining output picture content data. The color gamut conversion device 100 includes a format conversion unit 101, maximum saturation point calculating unit 102, and color conversion processing unit 103 as a principal configuration.

The format conversion unit 101 converts input picture content data made up of image data, e.g., from YCC data (Yi, Cbi, Cri) to YCH data (Yi, Ci, Hi) made up of luminance, saturation, and hue so as to prevent hue shift from occurrence due to color gamut conversion. Thus, converting into the YCH data enables color gamut conversion (coordinate movement) to be performed for each hue (on a plane), whereby occurrence of hue shift due to color gamut conversion can be suppressed.

Based on target color gamut information indicating a target color gamut which is the color gamut of the conversion destination of the original color gamut which is a color gamut to which the input picture content data belongs (a color gamut including a color distribution of all of the pixels in the input picture content data, which has been employed for generation of the input picture content data), the maximum saturation point calculating unit 102 calculates all of the YC coordinates information (Ycp, Ccp) of the maximum saturation point for each hue (Hi) (hereafter, also referred to "Cusp point"), of the target color gamut thereof. A white point and black point are fixed, so a target color gamut for each hue Hi is determined by determining the Cusp point.

Note that with the present Specification, YC coordinates are represented with (coordinate in the luminance direction (Y), coordinate in the saturation direction (C)). For example, when the YC coordinates of a certain point are (Y1, C1), the coordinate in the luminance (Y) direction of this point is Y1, and the coordinate in the saturation (C) direction is C1.

The color conversion processing unit 103 converts (compresses or enlarges) the color of each pixel of the input picture content data belonging to the original color gamut into a color of the target color gamut to obtain output picture content data. The color conversion processing unit 103 includes an LU-boundary specifying unit 111, transform function defining unit 112, virtual clip boundary determining unit 113, and mapping processing unit 114.

The LU-boundary specifying unit 111 specifies whether to coordinate-convert (map) which range of a color gamut into which range at the time of color gamut conversion (color gamut compression or color gamut enlargement), i.e., specifies a mapping source region and mapping destination region. The transform function defining unit 112 defines a color gamut conversion function. The virtual clip boundary determining unit 113 determines a boundary serving as a movement destination candidate for each pixel to be processed (virtual clip boundary) based on the transform function defined by the transform function defining unit 112. The mapping processing unit 114 performs mapping processing wherein each pixel to be processed is moved onto the virtual clip boundary determined by the virtual clip boundary determining unit 113.

Figure 1:
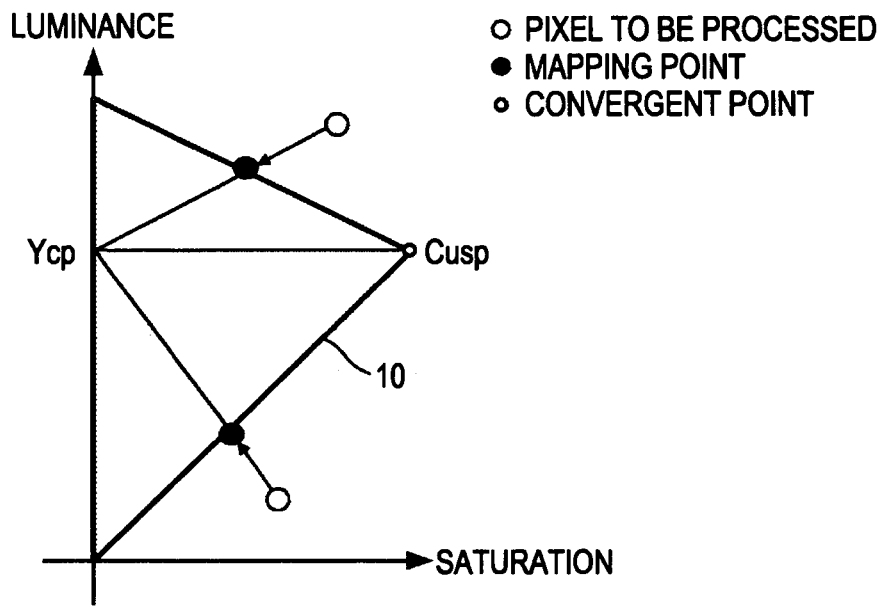
FIG. 1 is a diagram illustrating a coordinate moving situation example according to the color gamut conversion with the related art.
Figure 2:
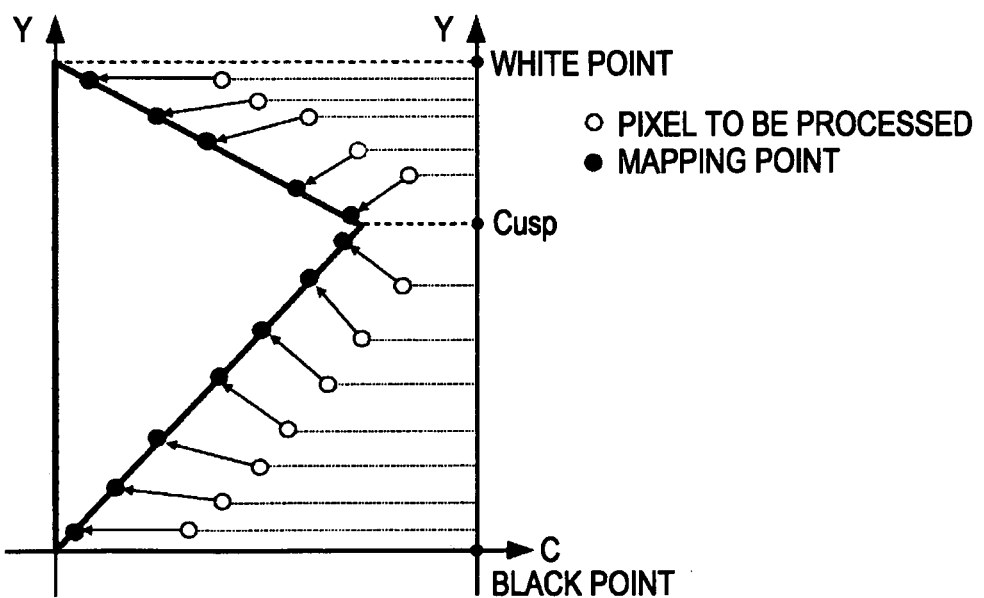
FIG. 2 is a diagram illustrating a coordinate moving situation example according to ideal color gamut conversion.
Figure 4:
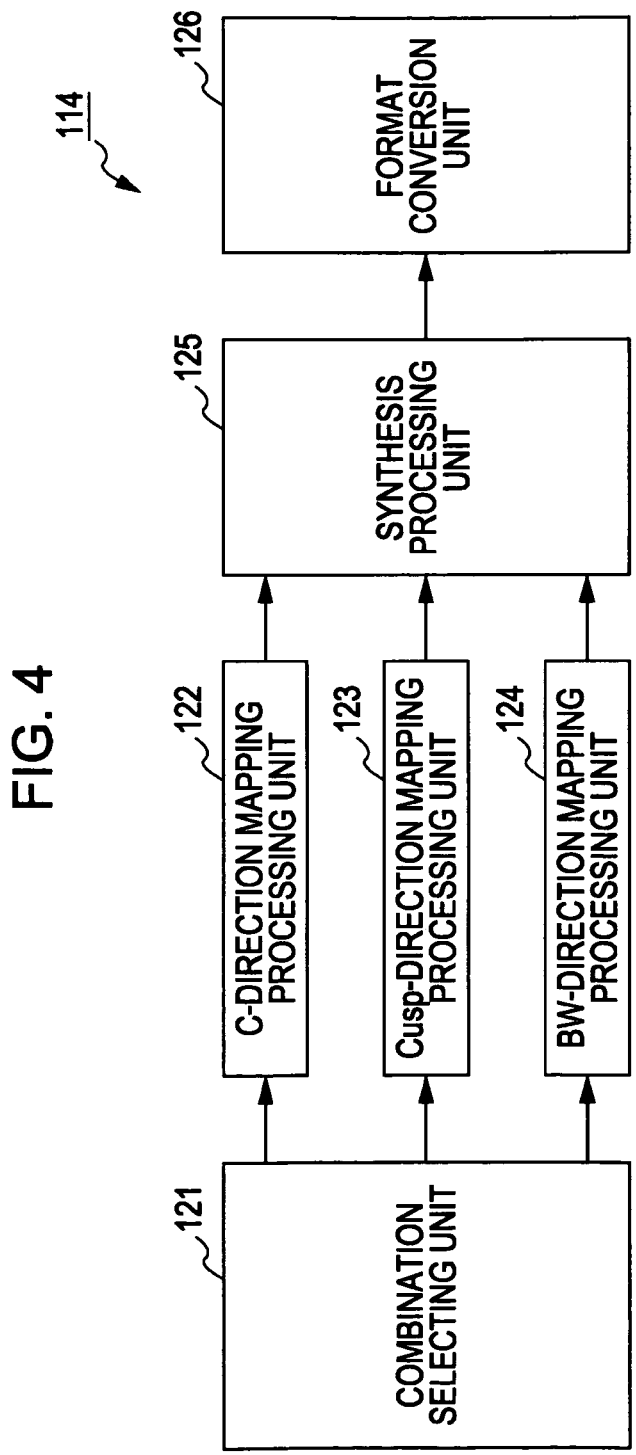
FIG. 4 is a block diagram illustrating a detailed configuration example of a mapping processing unit.

FIG. 4 is a block diagram illustrating a detailed configuration example of the mapping processing unit 114 in FIG. 1. As shown in FIG. 4, the mapping processing unit 114 includes a combination selecting unit 121, C-direction mapping processing unit 122, Cusp-direction mapping processing unit 123, BW-direction mapping processing unit 124, synthesis processing unit 125, and format conversion unit 126.

The combination selecting unit 121 selects a combination in a mapping direction to be synthesized (blended) for determining the coordinate movement destination of a pixel to be processed during color gamut conversion, from multiple coordinate movement directions (mapping directions) prepared beforehand. The C-direction mapping processing unit 122 through BW-direction mapping processing unit 124 perform mapping in a mutually different predetermined direction (fixed mapping direction). That is to say, the combination selecting unit 121 selects multiple mapping directions to be blended by selecting multiple processing units for executing mapping processing from the C-direction mapping processing unit 122 through BW-direction mapping processing unit 124.

The C-direction mapping processing unit 122 performs mapping processing in a fixed direction wherein the pixel to be processed is moved in a saturation direction (C direction) on luminance and saturation planes. The Cusp-direction mapping processing unit 123 performs mapping processing in a fixed direction wherein the pixel to be processed is moved in a rectilinear direction which connects a point having the same luminance value (Ycp) as that of the maximum saturation point (Cusp point) on the luminance (Y) axis, i.e., a point (Ycp, 0) in the YC coordinates and the pixel to be processed, with the luminance and saturation plane. That is to say, the point (Ycp, 0) on the YC coordinates is regarded as a convergent point. The BW-direction mapping processing unit 124 performs mapping processing in a fixed direction wherein the pixel to be processed is moved in a rectilinear direction which connects a black point and the pixel to be processed in a case wherein the luminance of the pixel to be processed is brighter than that of the Cusp point, and the pixel to be processed is moved in a rectilinear direction which connects a white point and the pixel to be processed in a case wherein the luminance of the pixel to be processed is darker than that of the Cusp point, on the luminance and saturation planes.

That is to say, the C-direction mapping processing unit 122 through BW-direction mapping processing unit 124 perform the coordinate movement (mapping) of the pixel to be processed in the direction selected by the combination selecting unit 121.

The synthesis processing unit 125 obtains each mapping processing result supplied from the C-direction mapping processing unit 122 through BW-direction mapping processing unit 124 which have performed mapping processing, and synthesizes (blends) each mapping direction with a ratio based on a blend function, thereby determining the final movement destination (mapping point) of the pixel to be processed. The format conversion unit 126 converts the coordinates of the mapping point, for example, from the YCH coordinates to the YCC coordinates.

Next, description will be made regarding a flow example of color gamut conversion processing executed by the color gamut conversion device 100, with reference to the flowchart in FIG. 5. Description will be made with reference to FIGS. 6 through 21, as appropriate.

Upon the color gamut conversion processing being started, in step S101 the format conversion unit 101 performs calculations, for example, such as shown in the following Expressions (1) through (4) so as not to cause hue shift due to color gamut conversion, and converts the format of input content data, for example, from the YCC to YCH (converts the coordinates system from the YCC coordinates to YCH coordinates).

$$Yi = Yi \quad (1)$$

$$Ci = \sqrt{Cbi^2 + Cri^2} \quad (2)$$

if $Cri > 0$ (3)

$$Hi = \arctan\left(\frac{Cri}{Cbi}\right) \times \frac{180}{\pi}$$

else $$Hi = \arctan\left(\frac{Cri}{Cbi}\right) \times \frac{180}{\pi} + 360 \quad (4)$$

Upon the format being converted, in step S102 the maximum saturation point calculating unit 102 calculates the YC coordinates information (Ycp, Ccp) of the maximum saturation point (Cusp point) of each hue Hi based on the target color gamut information.

The target color gamut information and original color gamut information are assumed to be transmitted/received by communication, for example, as the meta data of picture content data. Accordingly, for example, it is very important that the volume of such information is not great, such information can be readily described, and so forth. A specific example will be shown below.

FIG. 6 is a schematic view illustrating a format example of color gamut information. As shown in Table 141 in FIG. 6, several pieces of color gamut information which are frequently used is prepared beforehand, and indexes corresponding thereto are prepared. Only the index numeric value data thereof is transmitted/received by communication, thereby exchanging color gamut data. For example, if color gamut information to be transmitted is implicated beforehand, such as shown in FIG. 6, when desiring to transmit Wide RGB color gamut information, a numeric value "2" alone has to be transmitted. It goes without saying that this index may not be a numeric value, so may be a character such as an alphabet or a symbol, for example.

With this format, communication load can be reduced since the volume of data to be exchanged is small, but it is commonly difficult to define the color gamut inherent in each output device beforehand, and accordingly, exchange of representative color gamut data is performed consistently. Also, a reception side which has obtained an index has to render the received information into color gamut information having a form which can be employed for internal color gamut compression (later-described Cusp table, or the like).

FIG. 7 is a schematic view illustrating another format example of color gamut information. As shown in Table 142 in FIG. 7, in a case wherein a device which desires to express a color gamut is, for example, a display device for displaying an image, there can be calculated a transformation matrix for transforming a color which can be expressed by the display device as long as the color is xy chromaticity data of three primary colors, red, blue, green, and white point into a numeric value of color space which does not depend on any device (XYZ, CIELAB, etc.). That is to say, a color gamut can be defined with RGB. In the case of a display device of three colors or more, a color gamut is chromaticity information of all of the primary colors serving as the basis thereof. This format provides excellent approximation to a display device wherein additive color mixing properties hold, but is employed as approximation regarding other devices. Also, in the same way as the case shown in FIG. 6, the information has to be rendered into color gamut information which can be employed for color gamut compression internally on the reception side (such as a later-described Cusp table).

Figure 8A:
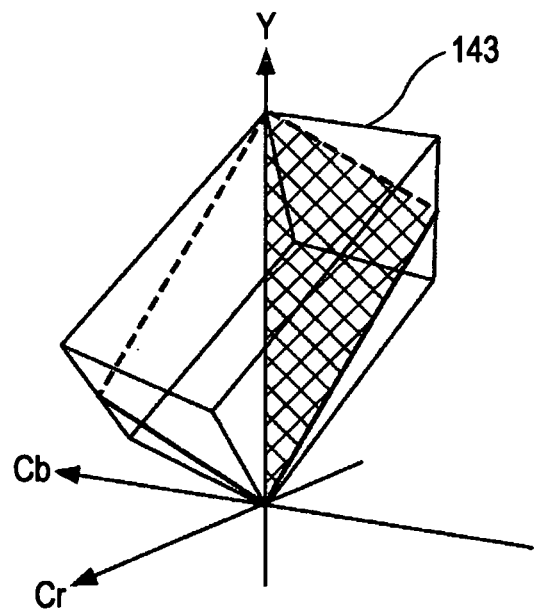
FIGS. 8A and 8B are schematic views illustrating a color gamut example.
Figure 8B:
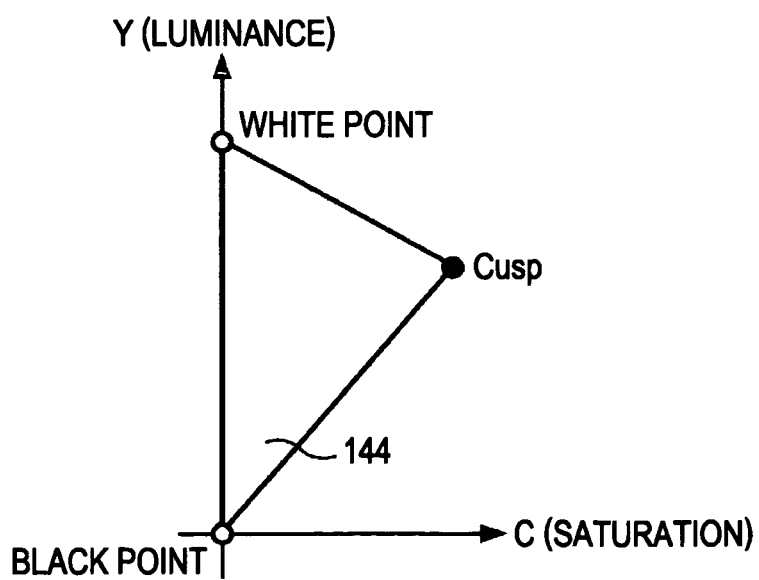

As shown in FIG. 8A, when expressing the color gamut of a certain device with YCC (Y, Cb, Cr) space (color gamut 143), as shown in FIG. 8B, a cut plane cut with an iso-hue plane can be represented with a YC2-dimensional plane wherein the vertical axis is luminance Y, and the horizontal axis is saturation C (color gamut 144). A color gamut shape on this plane can be approximated with a triangle connecting a white point, black point, and Cusp point such as the color gamut 144 shown in FIG. 8B as long as the YC coordinates of the maximum saturation point (Cusp) is understood. The color gamut 143 of the device can be defined approximately by making use of this feature as long as the YC coordinates of the Cusp point (Cusp information) on several representative hue planes is held as a numeric-value table. Such a table of the YC coordinates (Cusp information) of the maximum saturation point (Cusp) of a representative hue is referred to as a Cusp table. The volume of the Cusp table depends on the number of held representative hues, but particularly, the color gamut of a display device or the like can be approximated with sufficient excellent precision by the Cusp table made up of Cusp coordinates regarding six hues of red (R), green (G), blue (B), cyan (C), magenta (M), and yellow (Y).

Table 145 shown in FIG. 9A and Table 146 shown in FIG. 9B are Cusp tables (representative six hues) of sRGB color gamut in sYCC space. sYCC is luminance color difference separated space derived from RGB defined for high-vision by employing ITU-R BT. 601 which is international standard of a transformation matrix to YCC, and is color space which is wider than sRGB in which the actual situation of the color gamut of the display is reflected, and covers an output-side device such as a printer or the like. The coordinates of the Cusp point in this case (Cusp information) may be represented with YCH (luminance, saturation, hue) coordinates such as shown in Table 145 shown in FIG. 9A, or may be represented with YCbCr (luminance, color difference information) coordinates such as shown in Table 146 shown in FIG. 9B. The Cusp information of hues other than representative hues can be obtained with linear interpolation or the like from the Cusp information of the neighborhood thereof.

The luminance, color difference, hue, saturation information employed here are not restricted to the YCC space, and information conforming to luminance, color difference, hue, saturation information in other luminance and color difference space (e.g., CIELAB, CIELUV, etc.) may be employed.

Note that a hue to be set as a representative hue is arbitrary, and for example, may also be set with a certain hue interval. Table 147 shown in FIG. 10A is a Cusp table which represents Cusp information with the YCH coordinates wherein a representative hue is set for each degree, and Table 148 shown in FIG. 10B is a Cusp table which represents Cusp information with the YCbCr coordinates wherein a representative hue is set for each degree similarly. If an arrangement is made wherein such a Cusp table itself can be exchanged by communication as color gamut information, received color gamut information can be used as is at the time of color gamut compression on the reception side. Also, hues have an equal interval, so a reference method is easy. Such a Cusp table has features wherein if the hue interval is set great, the information volume gets smaller, and if the hue interval is set small, the information volume gets greater. It is desirable to determine the optimal interval while taking load and precision of transmission/reception of information into consideration. Also, when exchanging a Cusp table, handling processing can be readily realized such that hues are thinned out, and are then transmitted depending on a situation. The Cusp information of hues other than representative hues is obtained with linear interpolation or the like from the Cusp information of the neighborhood thereof.

In this case as well, the employed luminance, color difference, hue, saturation information are not restricted to the YCC space, and information conforming to luminance, color difference, hue, saturation information in other luminance and color difference space (e.g., CIELAB, CIELUV, etc.) may be employed.

As described above, an original color gamut and target color gamut can be exchanged in various formats, but for example, in a case wherein target color gamut information is given in a form such as a Cusp table which is table information made up of the YC coordinates of the Cusp point according to representative hues, the maximum saturation point calculating unit 102 employs the Cusp table thereof to calculate the YC coordinates information (Ycp, Ccp) of the Cusp point of a desired hue from the YC coordinates of the Cusp point of a nearby representative hue with linear interpolation or the like. Also, for example, in a case wherein target color gamut information is given with chromaticity information or the like, a Cusp table can be generated from the chromaticity information thereof with internal calculation, and the maximum saturation point calculating unit 102 can also obtain the YC coordinates information (Ycp, Ccp) of the Cusp point with reference to the Cusp table thereof. Upon the YC coordinates of the Cusp point being determined, a color gamut on the YC plane at the hue Hi is determined.

Note that, for example, in a case wherein output picture content data is recorded in a recording medium, when no communication can be performed with an output device for outputting the output picture content data, or when there are multiple devices available as output devices, which have a mutually different color gamut, there are conceived a case wherein the target color gamut information is not obtained, and a case wherein the target color gamut information is not uniquely determined. Thus, in a case wherein a target color gamut is unidentified or undetermined, the maximum saturation point calculating unit 102 may set predetermined color gamut information as tentative target color gamut information, for example. Note that, in this case, it is desirable to employ a common color gamut such as sRGB or sYCC as a color gamut to be set as tentative target color gamut information so as to be compatible with many more devices.

The following processing is performed similarly not only as to target color gamut information but also as to tentative target color gamut information. Accordingly, in the following, target color gamut information and tentative target color gamut information will not be distinguished, and both will be described as target color gamut information unless differentiation is appropriate.

Figure 5:
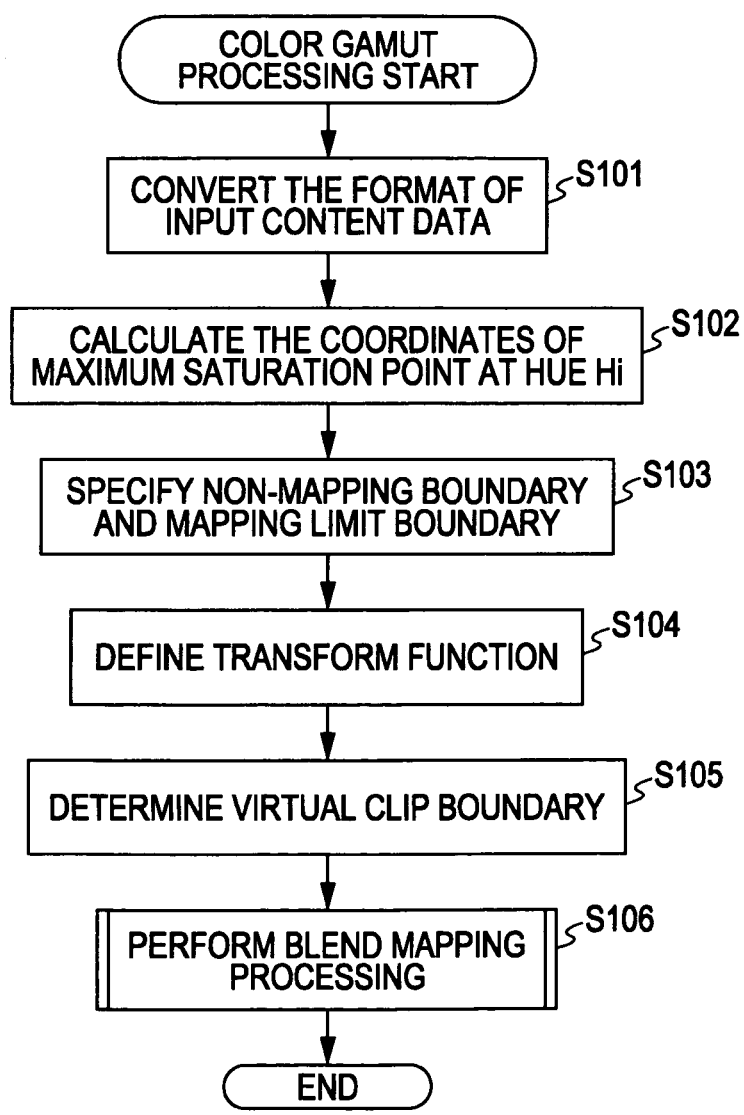
FIG. 5 is a flowchart for describing a flow example of color gamut conversion processing.

Now, description will be back to FIG. 5. In step S103, the LU-boundary specifying unit 111 specifies a non-mapping boundary and mapping limit boundary. Now, attention is paid to a compression ratio in a saturation direction.

Figure 11:
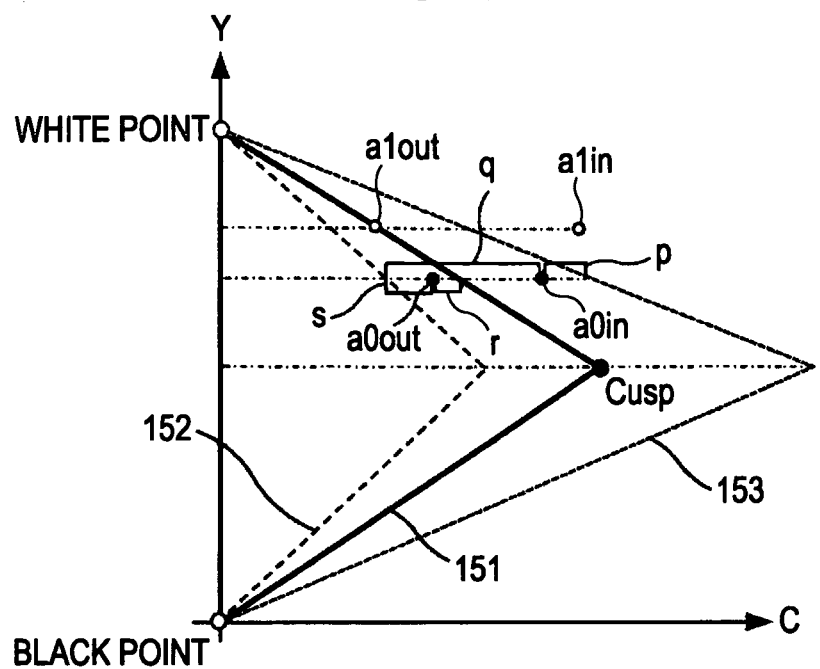
FIG. 11 is a schematic view for describing a situation example of color gamut compression.

FIG. 11 is a schematic view illustrating a situation of color gamut conversion in the case of compressing a color gamut. In FIG. 11, a region surrounded with a thick line (region surrounded with a triangle of which the peaks are a white point, black point, and Cusp point) is a final compression destination region (target compressed area), i.e., a target color gamut. A T-boundary (Target boundary) 151 is an edge (boundary) other than the Y axis of this target region. With the T-boundary 151 as reference, a boundary somewhat smaller in the saturation direction is a non-mapping boundary (U-boundary (Uncompressed boundary)) 152. A region surrounded with the Y axis and the U-boundary 152 is a non-mapping region, and pixels included in this region are not subjected to color gamut compression (coordinate movement). Next, how much region should be compressed into a compression destination region has to be specified. A boundary line for specifying whether the color of a picture content is expanded to how much color gamut is a mapping limit boundary (L-boundary (Limited boundary)) 153. With color gamut compression, the L-boundary 153 becomes a boundary line enlarged in the saturation direction as compared to the T-boundary 151. That is to say, color gamut compression means to compress a region surrounded with the U-boundary 152 and L-boundary 153 into a region surrounded with the U-boundary 152 and T-boundary 151.

When expressing this only in the saturation direction, according to this color gamut compression, the coordinates of a0in in FIG. 11 are moved to a0out, for example. Note that all of the colors having a higher saturation than that of the L-boundary 153 are clipped in the T-boundary 151 (subjected to coordinate movement onto the T-boundary 151). For example, the coordinates of a1in in FIG. 11 are moved to a1out.

Figure 12:
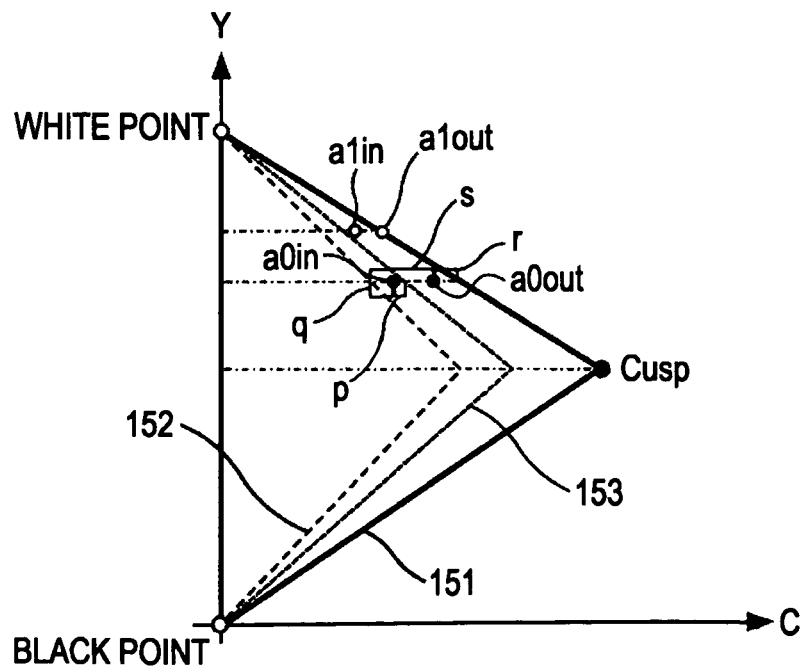
FIG. 12 is a schematic view for describing a situation example of color gamut enlargement.
Figure 13:
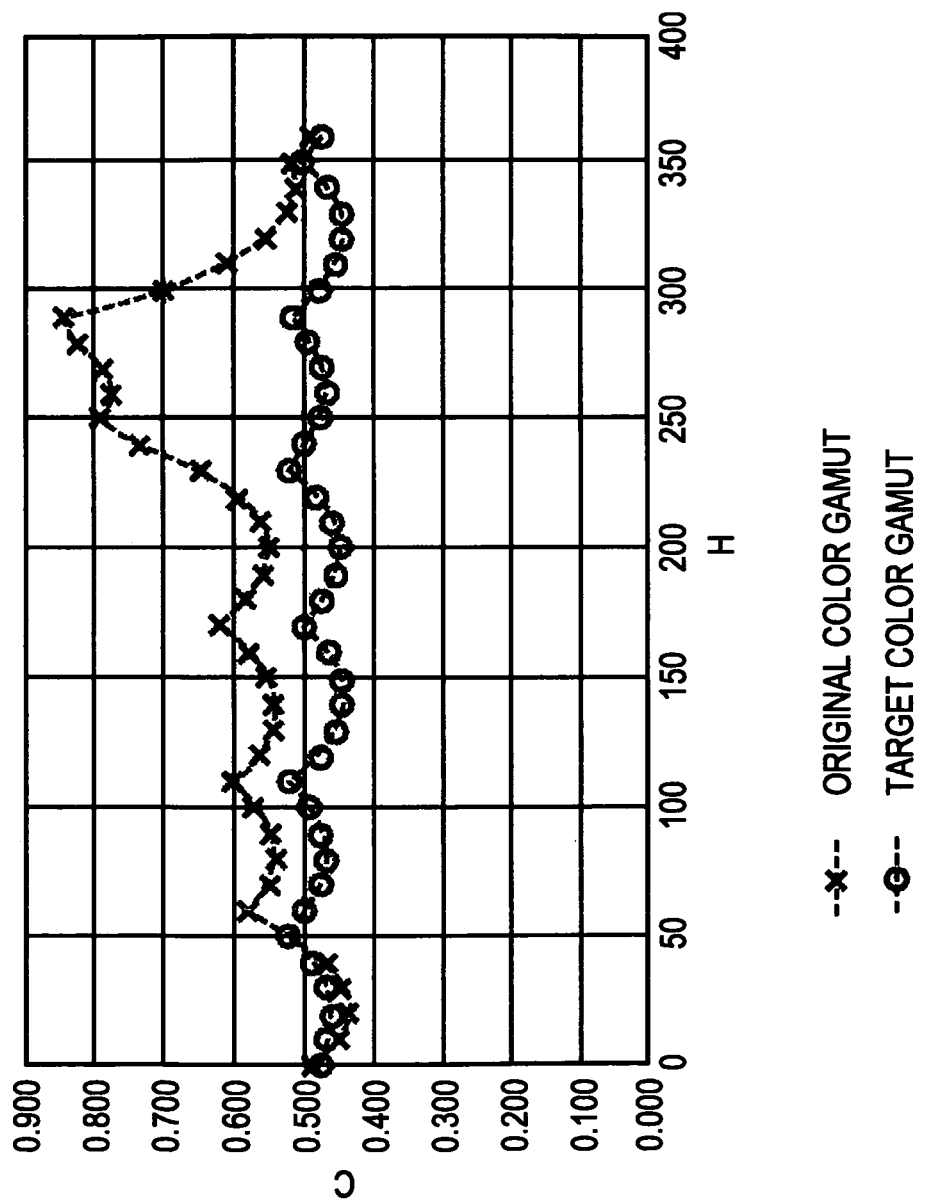
FIG. 13 is a diagram illustrating an example of a Cusp table for saturation.

FIG. 12 is a schematic view illustrating a situation of color gamut conversion in the case of enlarging a color gamut. The case of enlargement differs from the case of compression in that the L-boundary 153 becomes a boundary line reduced in the saturation direction as compared to the T-boundary 151. That is to say, color gamut enlargement means to enlarge a region surrounded with the U-boundary 152 and L-boundary 153 to a region surrounded with the U-boundary 152 and T-boundary 151.

When expressing this only in the saturation direction, according to this color gamut enlargement, the coordinates of a0in in FIG. 12 are moved to a0out, for example. Note that all of the colors having a higher saturation than that of the L-boundary 153 are clipped in the T-boundary 151 (subjected to coordinate movement onto the T-boundary 151). For example, the coordinates of a1in in FIG. 12 are moved to a1out.

The L-boundary 153 and U-boundary 152 are set as a saturation enlargement ratio or saturation reduction ratio when setting the saturation of the T-boundary 151 to "1". There can be conceived various setting methods, but a constant value may be employed regardless of hues, or a setting value may also be changed for each hue. On the other hand, in the case of changing the values of the L-boundary 153 and U-boundary 152 for each hue, a so-called LU table is defined. This is table information including the values of the L-boundary 153 and U-boundary 152 for each hue, whereby there can be specified regarding whether color gamut mapping performed with the hue thereof is color gamut compression or color gamut enlargement in accordance with the value of the L-boundary 153.

When there is original color gamut information, the expanded level of the color in the saturation direction of a picture content can be understood, so the L-boundary 153 can be determined by referencing the original color gamut information. Now, let us assume that a Cusp table for the saturation (C) of an original color gamut and target color gamut is in a state such as shown in the graph in FIG. 13. Upon the value of the original color gamut being divided by the value of the target color gamut, there can be obtained the saturation ratio of the Cusp point of the original color gamut as to the target color gamut for each hue such as a graph shown in FIG. 14.

A portion of which the saturation ratio is smaller than 1.0 means that the target color gamut is wider than the original color gamut, and in such a case, color gamut mapping to be performed is color gamut enlargement.

Figure 15:
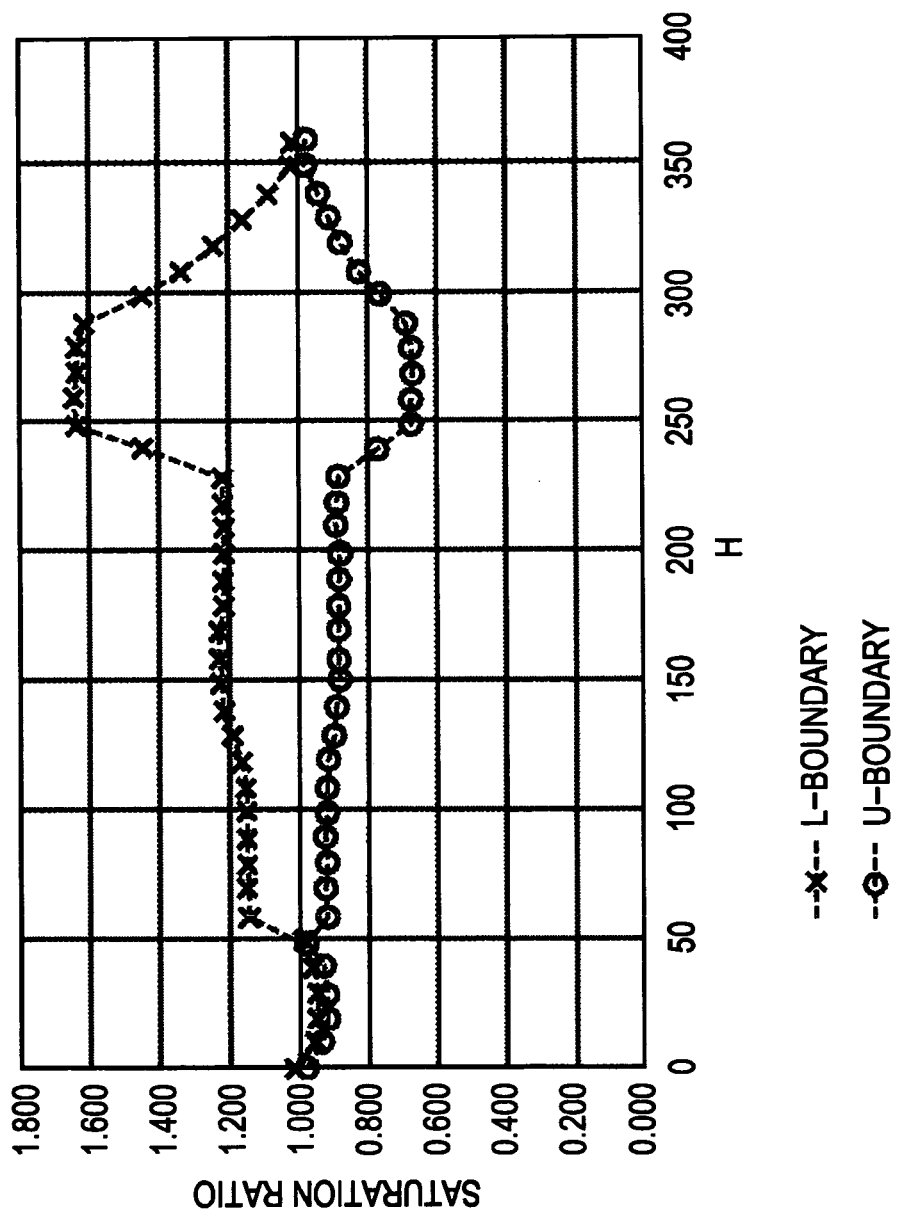
FIG. 15 is a diagram illustrating an LU table example.

Next, the mapping limit boundary (L-boundary) 153 is defined for each hue, but the saturation ratio itself of each hue shown in FIG. 15 can be defined as the mapping limit boundary (L-boundary) 153, for example.

Figure 14:
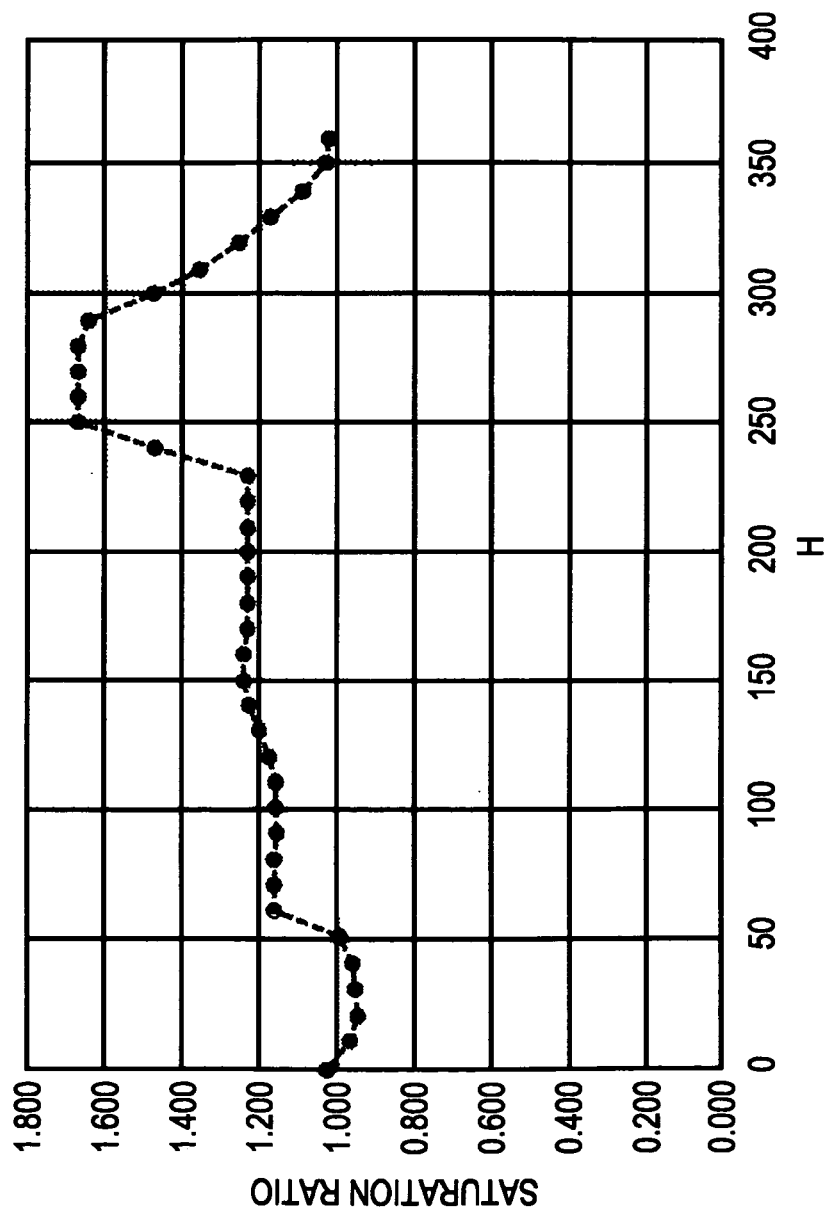
FIG. 14 is a diagram illustrating a saturation ratio example.

Also, the non-mapping boundary (U-boundary) 152 is defined for each hue, but there can be conceived various methods for determining the non-mapping boundary (U-boundary) 152. For example, an arrangement may be made wherein when a region to be compressed or enlarged is great, a mapping destination region is also assumed to be somewhat great, and when the region to be compressed or enlarged is small, the mapping destination region is also assumed to be small, thereby determining the U-boundary 152 so as to maintain a certain level of the region ratio thereof. For example, an arrangement may be made wherein the U-boundary 152 (saturation reduction ratio) is a half of the L-boundary 153 (saturation enlargement ratio) at the time of color gamut compression, and the U-boundary 152 (saturation reduction ratio) is the color gamut reduction ratio which is double the L-boundary 153 (saturation enlargement ratio) at the time of color gamut enlargement. In this case, for example, if we say that a saturation ratio such as shown in FIG. 14 is given as the L-boundary 153, an LU table such as shown in FIG. 15 is generated.

Figure 16:
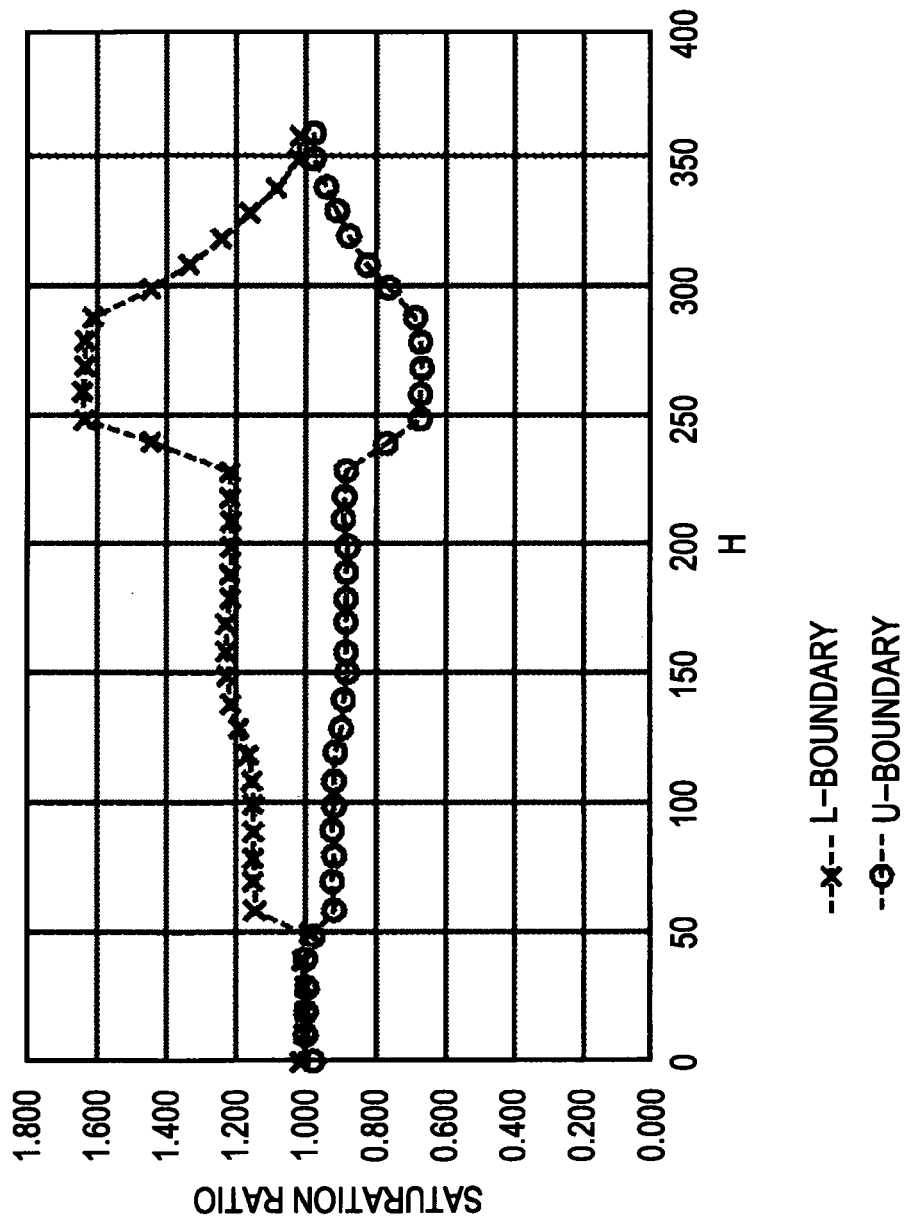
FIG. 16 is a diagram illustrating another LU table example.

Note that, for example, there is a color gamut conversion method wherein only color gamut compression for colors outside the target color gamut is performed, and color gamut enlargement for colors within the target color gamut is not performed. In the case of such a color gamut conversion method, an LU table such as shown in FIG. 16 can be obtained, for example. With the saturation ratio for each hue of the Cusp point, of the saturation ratio for each hue shown in FIG. 14, a portion of which the value is less than "1", and is fixed to "1.0" is employed as the L-boundary 153, the U-boundary 152 is obtained based on the L-boundary 153, thereby generating an LU table as described above.

Figure 17:
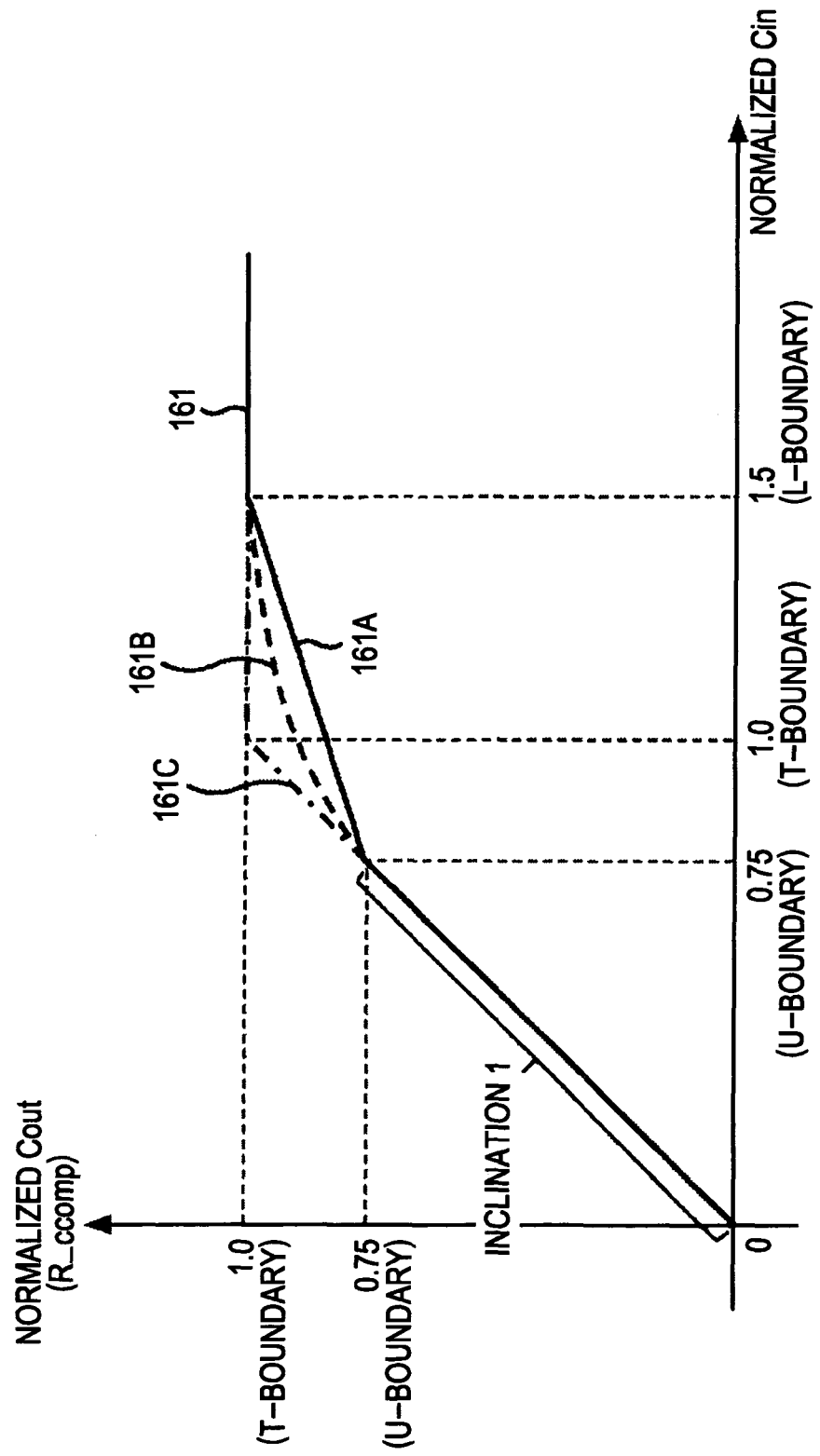
FIG. 17 is a graph illustrating an example of a compressing direction mapping function.
Figure 18:
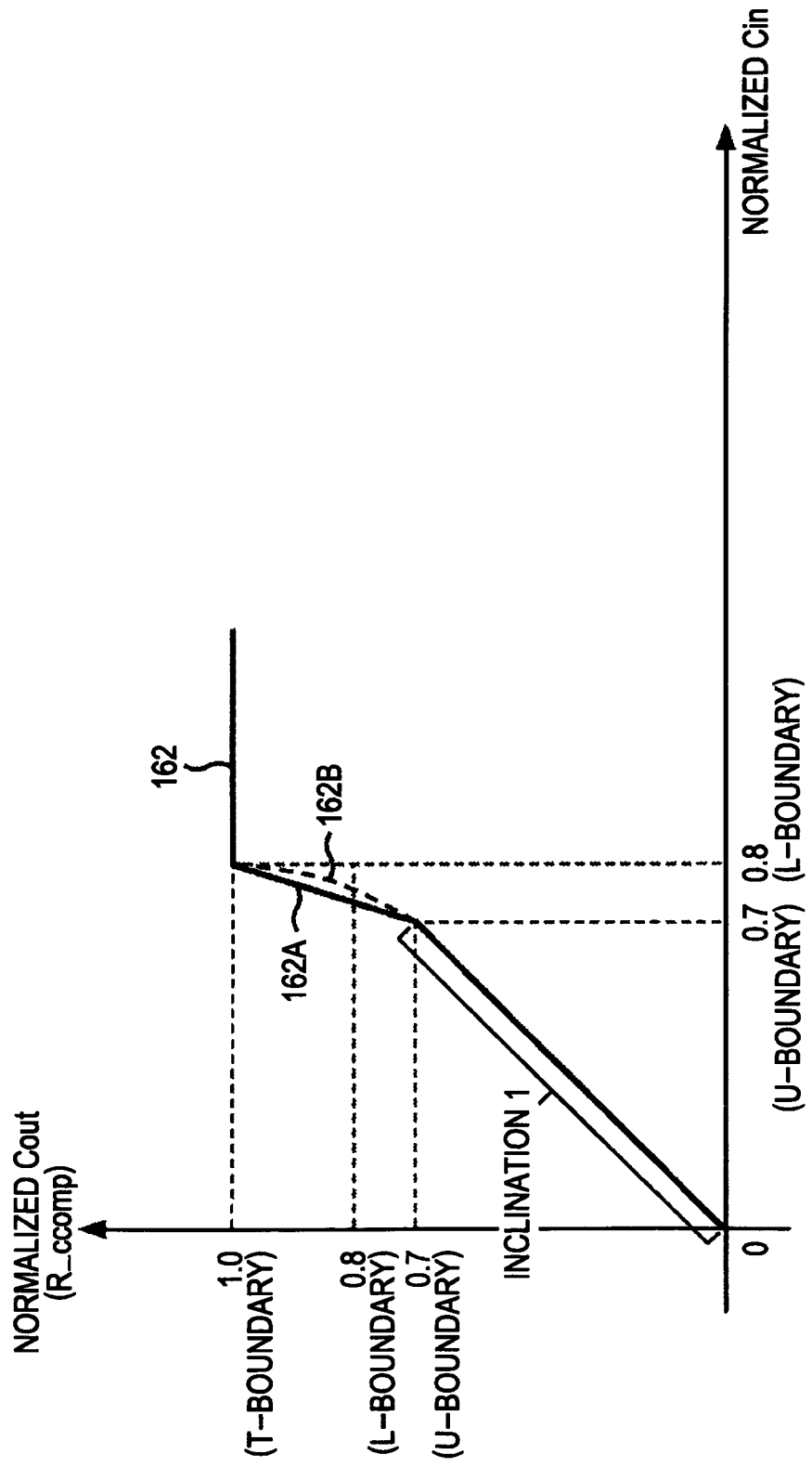
FIG. 18 is a graph illustrating an example of an enlarging direction mapping function.

Now description will be back to FIG. 5. In step S104, the transform function defining unit 112 defines a transform function. Upon a compression situation when assuming that the setting value of the U-boundary 152 is "0.75", and the setting value of the L-boundary 153 is "1.5" being represented with a function, a curve 161 shown in FIG. 17 is obtained. This curve 161 will be referred to as a mapping function. A range of which the inclination is "1" indicates a non-mapping region. Color gamut compression indicates that a range surrounded with the U-boundary 152 and L-boundary 153 on the horizontal axis is compressed to obtain a range surrounded with the U-boundary 152 and T-boundary 151 on the vertical axis. The compression method at this time is arbitrary, and there are conceived various methods. For example, a solid line 161A denotes linear compression. A dashed line 161B is an example wherein the function is bent smoothly so as to be compressed gradually. A single-dot broken line 161C denotes not compression but a color gamut clip as to the T-boundary 151.

That is to say, according to the form of the curve 161 within this range, for example in FIG. 11, there is determined the ratio (r:s) between the distance to the T-boundary 151 and distance to the U-boundary 152 of the a0out which is the movement destination of the a0in wherein the ratio between the distance to the L-boundary 153 and the distance to the U-boundary 152 is p:q. In other words, the function (compression function) indicated with the curve 161 indicates a compression ratio (R_ccomp) in the saturation direction of a certain pixel to be processed, and the virtual clip boundary of the pixel to be processed is determined according to the output value of this function.

The mapping function is determined depending on the values of the L-boundary 153 and U-boundary 152, so if the values of the L-boundary 153 and U-boundary 152 are changed for each hue, the mapping function is also changed. Now, let us say that a numeric value "0.8" which is less than "1.0" is given to the L-boundary 153, and the U-boundary 152 is "0.7", mapping in this case is enlargement processing. The situation of the mapping function in this case is shown in a curve 162 in FIG. 18. In the same way as in the case of the curve 161, a range of which the inclination is "1" denotes a non-mapping region. A solid line 162A means linear enlargement. A dashed line 162B is an example wherein enlargement is performed gradually.

That is to say, according to the form of the curve 162 within this range, for example in FIG. 11, there is determined the ratio (r:s) between the distance to the T-boundary 151 and distance to the U-boundary 152 of the a0out which is the movement destination of the a0in wherein the ratio between the distance to the L-boundary 153 and the distance to the U-boundary 152 is p:q. In other words, the function (enlargement function) indicated with the curve 162 indicates an enlargement ratio (R-ccomp) in the saturation direction of a certain pixel to be processed, and the virtual clip boundary of the pixel to be processed is determined according to the output value of this function.

Now, description will be back to FIG. 5. In step S105, the virtual clip boundary determining unit 113 determines a virtual clip boundary.

Figure 19:
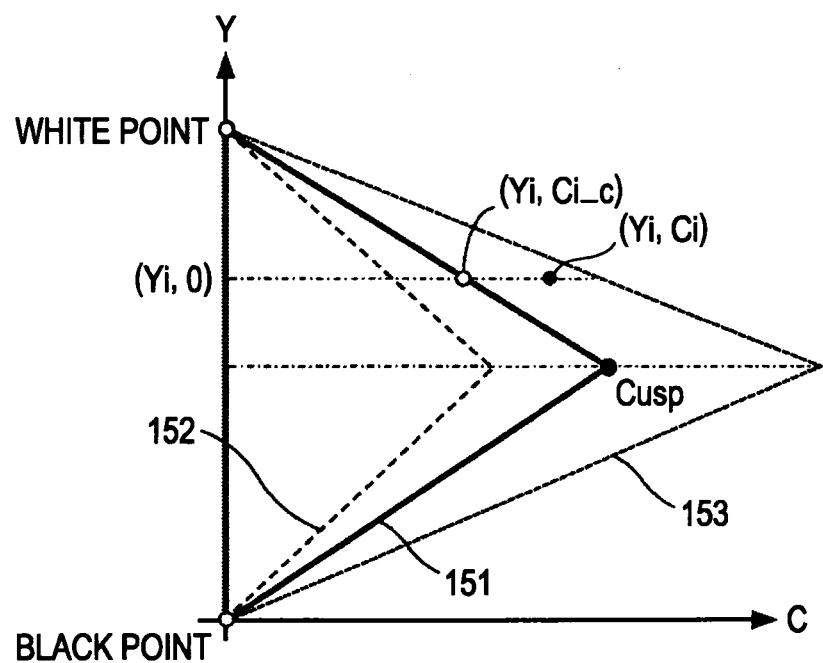
FIG. 19 is a schematic view illustrating a saturation calculation method example.

The virtual clip boundary determining unit 113 employs the saturation $C_i$ of the pixel to be processed to reference the transform function (compression function or enlargement function) defined by the processing in step S104. However, the transform function is a value obtained by normalizing the saturation at the T-boundary 151 with "1", so saturation Ci_c at the T-boundary 151 having the same luminance as that of the pixel to be processed has to be obtained. For example, as shown in FIG. 19, if we say that the YC coordinates of the pixel to be processed is (Yi, Ci), the saturation Ci_c at the T-boundary 151 having the same luminance as that of the pixel to be processed can be obtained as the saturation of an intersection point between a straight line connecting a white point and Cusp point, and a straight line connecting the pixel to be processed (Yi, Ci) and the luminance point (Yi, 0) of the pixel to be processed on the Y axis.

Saturation Ci_norm for referencing the compression function can be calculated such as shown in the following Expression (5) by employing the saturation Ci_c of this intersection point and the saturation Ci of the pixel to be processed.

$$Ci\_norm = \frac{Ci}{Ci\_c} \quad (5)$$

For example, the virtual clip boundary determining unit 113 employs this saturation Ci_norm to reference the compression function indicated by the curve 161 in FIG. 17, and determines the compression ratio R_ccomp in the saturation direction of the pixel to be processed. Upon the R_ccomp being determined, the virtual clip boundary (V-boundary (Virtual clip boundary)) of the pixel to be processed can be determined. Thus, the virtual clip boundary (V-boundary) is determined, whereby color gamut compression can be conceived as processing for repeatedly performing color gamut clip.

A in FIG. 20 is a schematic view illustrating a color gamut clip situation. Color gamut clip denotes, as shown in A in FIG. 20, that a color outside the target color gamut is moved onto the T-boundary 151 which is the boundary of the target color gamut (clipped in the T-boundary 151). For example, in A in FIG. 20, a pixel to be processed shown in a white circle is subjected to coordinate movement to a clip point on the T-boundary 151 shown in a filled circle.

B in FIG. 20 is a schematic view illustrating a color gamut compression situation. As described above, color gamut compression means to move a pixel to be processed onto the virtual clip boundary (V-boundary) corresponding to the pixel to be processed thereof. For example, in B in FIG. 20, a pixel to be processed 181 is subjected to coordinate movement to a clip point 182 on a V-boundary 191A, and a pixel to be processed 183 is subjected to coordinate movement to a clip point 184 on a V-boundary 191B. That is to say, color gamut compression can be regarded as equivalent to performing the same processing as that in the case of a color gamut clip in A in FIG. 20 for each pixel to be processed.

For example, upon description being made regarding the Cusp point, the YC coordinates (Ycp, Ccp_V) of a clip point Cusp_V of the Cusp point of the YC coordinates (Ycp, Ccp) can be calculated such as the following Expression (6) by employing the compression ratio R_ccomp in the saturation direction.

$$Cusp\_V=(Ycp,Ccp\_V)=(Ycp,R\_ccomp \times Ccp) \quad (6)$$

Figure 21:
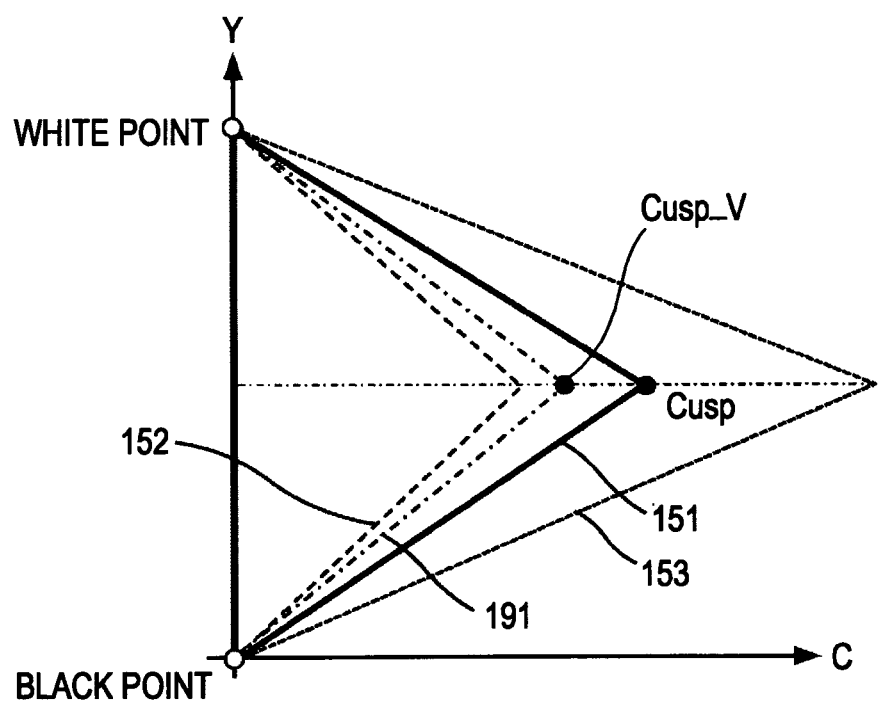
FIG. 21 is a schematic view illustrating a virtual clip boundary example.

A virtual clip boundary (V-boundary) 191 is determined from the YC coordinates of the clip point Cusp_V. For example, as shown in FIG. 21, the virtual clip boundary (V-boundary) 191 of the Cusp point is made up of a line segment with the clip point Cusp_V and a white point as both ends, and a line segment with the clip point Cusp_V and a black point as both ends.

That is to say, the V-boundary 191 is determined with the above-mentioned compression function, and the ratio (p:q) between the distance to the L-boundary 153 and the distance to the U-boundary 152 of a pixel to be processed. In other words, pixels to be processed having the same ratio (p:q) between the distance to the L-boundary 153 and the distance to the U-boundary 152 share the V-boundary 191.

Note that description has been made so far regarding the case of compressing a color gamut, but the method for determining the V-boundary 191 in the case of enlarging a color gamut is basically the same as that in the case of compressing a color gamut.

Now, description will be back to FIG. 5. In step S106, the mapping processing unit 114 executes blend mapping processing wherein each pixel to be processed is mapped (subjected to coordinate movement) on the V-boundary 191 corresponding to each pixel to be processed determined such as described above, in a direction where multiple mapping directions are blended. A detailed processing flow example of this blend mapping processing will be described later.

Upon the processing in step S106 being ended, the color gamut conversion device 100 ends the color gamut conversion processing. As described above, the color gamut conversion device 100 converts a color gamut from an original color gamut to a target color gamut appropriately.

Next, a flow example of the blend mapping processing executed in step S106 in FIG. 5 will be described with reference to the flowchart in FIG. 22. Description will be made with reference to FIGS. 23 through 30 as appropriate.

Upon the blend mapping processing being started, in step S121 the combination selecting unit 121 determines whether or not both of the color gamut compression processing and color gamut enlargement processing are performed regarding input picture content data to be subjected to color gamut conversion as color gamut conversion. At this time, the combination selecting unit 121 references the LU table to determines whether or not the enlargement processing is performed depending on regarding whether or not there is a value less than 1 in the values of the L-boundary 153. In a case wherein determination is made that the enlargement processing is also performed, the combination selecting unit 121 selects the C-direction mapping processing unit 122 and Cusp-direction mapping processing unit 123, and advances the processing to step S122.

In step S122, the C-direction mapping processing unit 122 executes C-direction mapping processing wherein a pixel to be processed is moved (mapped) onto the virtual clip boundary (V-boundary) 191 in the saturation (C) direction.

Figure 23:
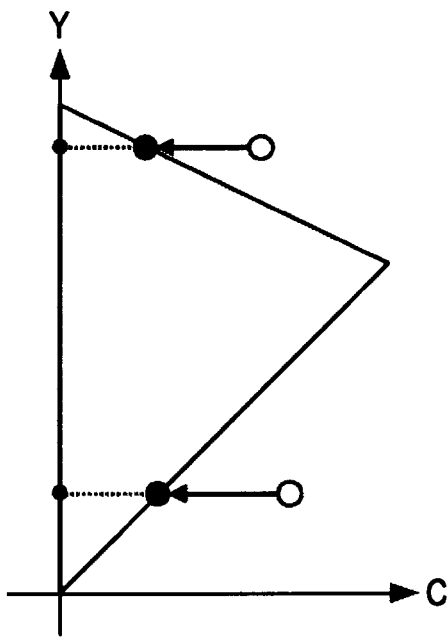
FIG. 23 is a diagram for describing a situation of C-direction mapping processing.

FIG. 23 is a diagram illustrating a situation example of the C-direction mapping. As shown in FIG. 23, in this case, only the saturation direction is compressed, but the luminance direction is not compressed. That is to say, pixels mapped onto the same virtual clip boundary (V-boundary) 191 (i.e., mapping destination) have a mutually different luminance value, so are mapped in a mutually different position. That is to say, a pixel to be processed corresponds to the mapping destination thereof one on one. Accordingly, in FIG. 23, only an example in the compression direction is shown, but the C-direction mapping may be applied to the enlargement direction (reversible). The C-direction mapping has an advantage in the compression direction wherein colors are eliminated, and has an advantage in the enlargement direction wherein colors are remained.

Figure 22:
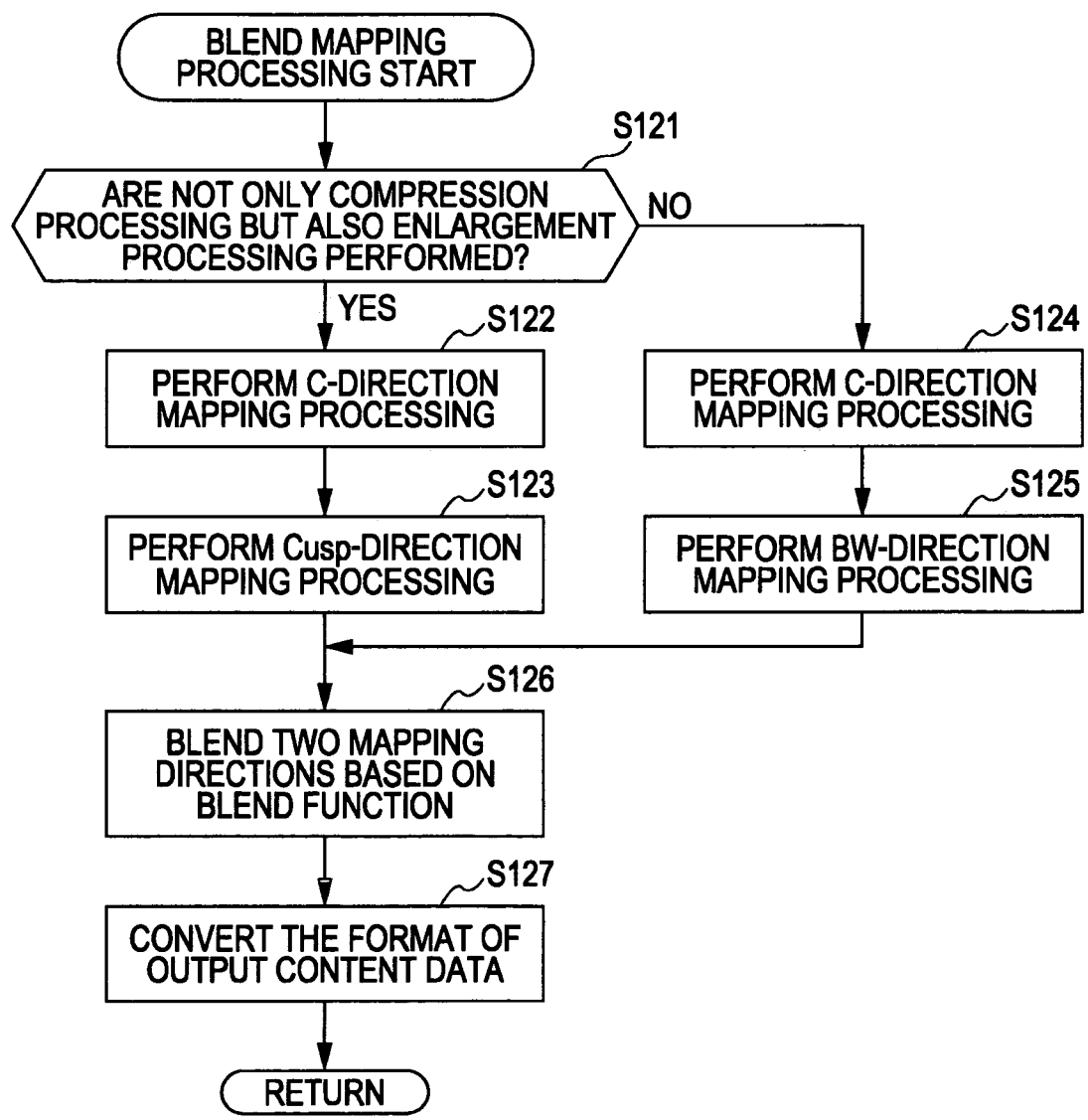
FIG. 22 is a flowchart for describing a flow example of blend mapping processing.

Now, description will be back to FIG. 22. In step S123, the Cusp-direction mapping processing unit 123 performs mapping processing wherein the YC coordinates are moved (mapped) onto the virtual clip boundary (V-boundary) 191 in a rectilinear direction connecting a point (Ycp, 0) and a pixel to be processed.

Figure 24:
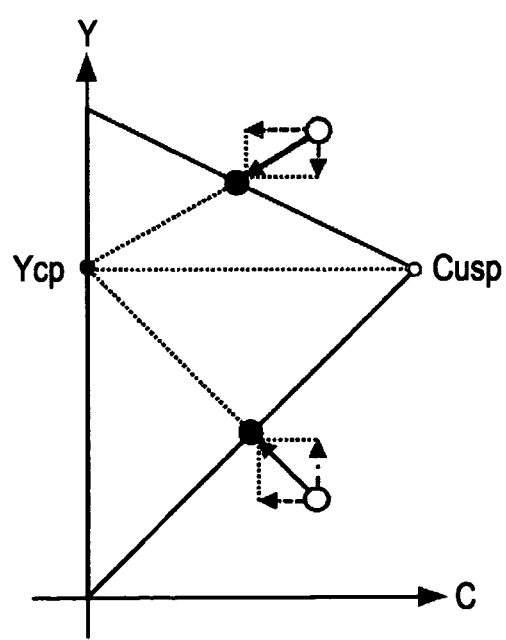
FIG. 24 is a diagram for describing a situation of Cusp-direction mapping processing.

FIG. 24 is a diagram illustrating a situation example of Cusp-direction mapping. As shown in FIG. 24, in this case, a pixel to be processed is mapped onto the virtual clip boundary (V-boundary) 191 with a point (Ycp, 0) on the luminance (Y) axis having the same luminance value as that of the Cusp point as a convergent point. Accordingly, in this case as well, pixels to be mapped onto the same virtual clip boundary (V-boundary) 191 (i.e., mapping destination) are mapped in a mutually different position. Accordingly, in FIG. 24, only an example in the compression direction is shown, but the Cusp-direction mapping may be applied to the enlargement direction (reversible). The Cusp-direction mapping has an advantage in the compression direction wherein colors are remained to some extent, and has an advantage in the enlargement direction wherein colors are eliminated to some extent.

Now, description will be back to FIG. 22. Upon the C-direction mapping processing and Cusp-direction mapping processing being completed, the processing proceeds to step S126.

Also, in a case wherein determination is made in step S121 that only the compression processing is performed regarding the input picture content data to be subjected to color gamut conversion, and the enlargement processing is not performed, the combination selecting unit 121 selects the C-direction mapping processing unit 122 and BW-direction mapping processing unit 124, and advances the processing to step S124.

In step S124, the C-direction mapping processing unit 122 executes the C-direction mapping processing in the same way as in the case of step S122.

In step S125, the BW-direction mapping processing unit 124 performs mapping processing wherein in a case in which the luminance of a pixel to be processed is brighter than the luminance of the Cusp point, the pixel to be processed is moved (mapped) onto the virtual clip boundary (V-boundary) 191 in a rectilinear direction connecting a black point and the pixel to be processed, and in a case in which the luminance of the pixel to be processed is darker than the luminance of the Cusp point, the pixel to be processed is moved (mapped) onto the virtual clip boundary (V-boundary) 191 in a rectilinear direction connecting a white point and the pixel to be processed.

Figure 25:
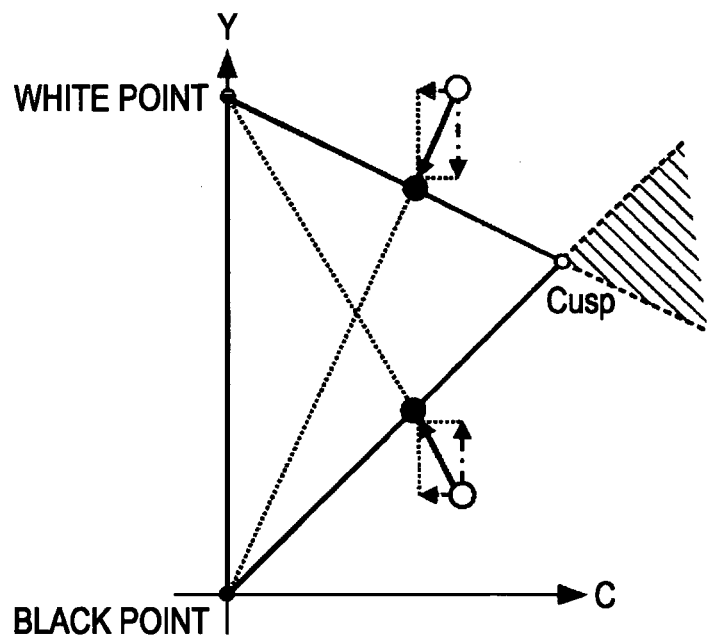
FIG. 25 is a diagram for describing a situation of BW-direction mapping processing.

FIG. 25 is a diagram illustrating a situation example of the BW-direction mapping. As shown in FIG. 25, in this case, a pixel to be processed which is brighter than the Cusp point is mapped onto the virtual clip boundary (V-boundary) 191 with a black point as a convergent point, and a pixel to be processed which is darker than the Cusp point is mapped onto the virtual clip boundary (V-boundary) 191 with a white point as a convergent point. In this case, all of the pixels to be processed disposed in a portion filled with slanting lines in FIG. 25 are mapped onto the Cusp point. Accordingly, this method is available only in the case of the compression direction, and is not unavailable in the enlargement direction (irreversible). Of the above-mentioned three fixed mapping methods, the BW-direction mapping is mapping wherein colors are remained most, as compression-direction mapping.

Now, description will be back to FIG. 22. Upon the C-direction mapping processing and BW-direction mapping processing being ended, the processing proceeds to step S126.

In step S126, the synthesis processing unit 125 blends the mapping results in the two mapping directions, performed in steps S122 and S123, or in steps S124 and S125, based on a blend function.

Figure 26:
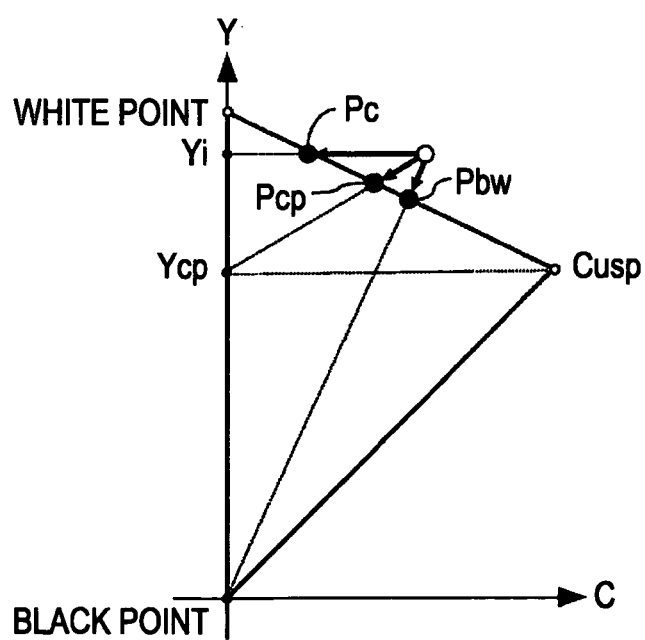
FIG. 26 is a diagram illustrating a difference example of each of mapping directions.

With the above-mentioned three fixed mapping methods, as shown in FIG. 26, the mapping directions differ mutually. In FIG. 26, a white circle denotes an example of a pixel to be processed, Pc denotes a mapping destination example of the pixel to be processed according to the C-direction mapping, Pcp denotes a mapping destination example of the pixel to be processed according to the Cusp-direction mapping, and Pbw denotes a mapping destination example of the pixel to be processed according to the BW-direction mapping.

In order to determine a final mapping direction, the synthesis processing unit 125 blends at least the two selected by the combination selecting unit 121, of the multiple fixed mapping directions of which the directions differ mutually. At this time, two mapping directions of which the properties differ, such as a direction for remaining colors, and a direction for eliminating colors, are blended, whereby the synthesis processing unit 125 can adjust a desired mapping direction according to the blended ratio thereof. In the case of the above-mentioned three fixed mapping directions, as described above, the following two methods can be conceived, for example.

That is to say, there are a method for synthesizing the C-direction mapping and BW-direction mapping (steps S124 and S125), and a method for synthesizing the C-direction mapping and Cusp-direction mapping (steps S122 and S123). The combination selecting unit 121 selects which combination is employed depending on whether or not there is conversion in the enlargement direction.

The method for synthesizing the C-direction mapping and BW-direction mapping is a combination of two mapping directions wherein the properties for eliminating colors and the properties for remaining colors differ most, so adjustment can be readily made (adjustable range is wide). In particular, with regard to the BW-direction mapping, colors are remained with a deeper hue, so contrast adjustment width is very wide, and accordingly, an image can be adjusted to obtain more natural appearance. However, the BW-direction mapping is in an irreversible mapping direction, and is accordingly prevented from being employed for the enlargement processing.

On the other hand, in the case of synthesizing the C-direction mapping and Cusp-direction mapping, the properties of the Cusp-direction mapping is somewhat ambiguous as compared to the BW-direction mapping, an adjustable range in the case of color gamut compression or the like is narrower as compared to the case of synthesizing the C-direction mapping and BW-direction mapping. An image which is a compression result also has an appearance with insufficient contrast in some cases as compared to the case of synthesizing the C-direction mapping and BW-direction mapping. However, the combined mapping directions are both reversible, and can also be employed for the enlargement processing.

That is to say, in general, in the case of performing color gamut compression alone, the method for synthesizing the C-direction mapping and BW-direction mapping can obtain a more natural appearance result as compared to the method for synthesizing the C-direction mapping and Cusp-direction mapping, but in the event of performing color gamut enlargement, the method for synthesizing the C-direction mapping and Cusp-direction mapping can obtain a more desirable result.

Figure 27:
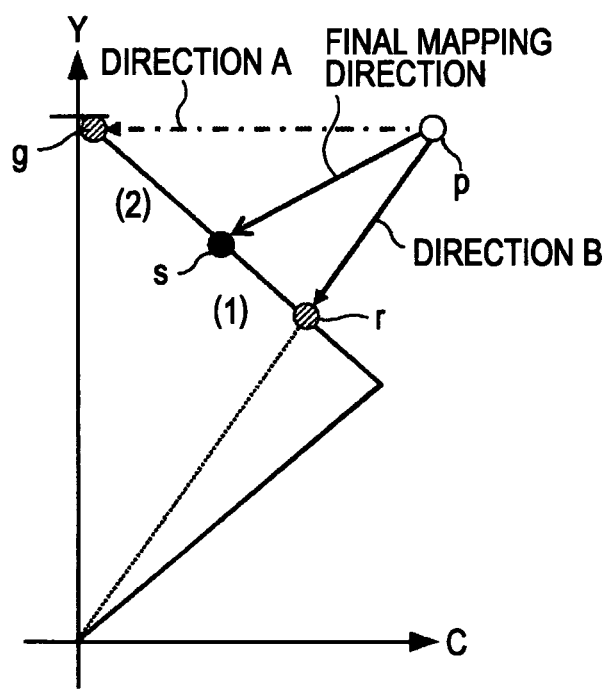
FIG. 27 is a schematic view illustrating a blend situation example.

In general, in order to approximate to an ideal clip direction, the combination selecting unit 121 defines at least two types of fixed mapping directions, but as shown in FIG. 27, mapping (direction A) wherein only the saturation direction is compressed, and colors are eliminated is taken as one of the fixed mapping directions, and mapping (direction B) wherein both of the saturation direction and luminance direction are moved, and colors are remained is taken as the other. A final mapping direction is determined by the synthesis processing unit 125 blending the two directions with an appropriate ratio. With the example in FIG. 27, the directions A and B are blended with a ratio of 1:2. That is to say, if the blend ratio between the fixed mapping directions can be defined appropriately for each pixel to be processed, mapping can be performed so as to approximate to an ideal mapping direction. Therefore, the synthesis processing unit 125 performs mapping by employing a blend function wherein a mixed ratio is specified for each hue.

Figure 28:
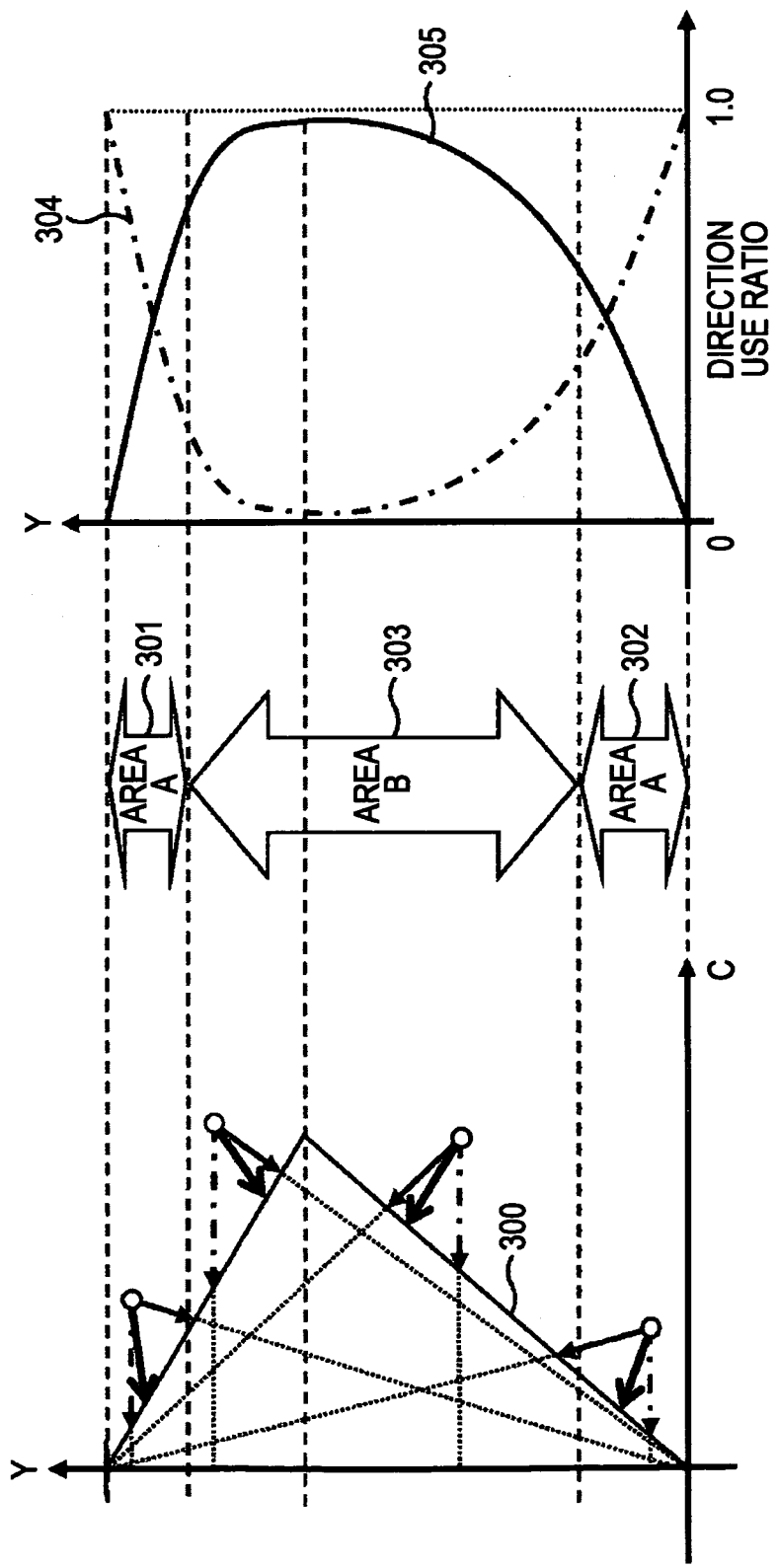
FIG. 28 is a diagram illustrating a blend function example.

An example of such a blend function is shown in FIG. 28. In the case of this blend function, as to a color gamut 300 shown in the left side of FIG. 28, the use ratio of the C-direction mapping point is exhibited regarding a pixel to be processed of which the luminance is around a white or black point such as an area A shown with both arrows 301 and both arrows 302 shown in the center of FIG. 28, and the use ratio of the BW-direction mapping point is exhibited regarding a pixel to be processed of which the luminance (curve 305 on the right side of FIG. 28) is around the Cusp such as an area B shown with both arrows 303. As shown in the right side of FIG. 28, upon a blend function such as a curve 305 is given to one of the two mapping directions to be blended, a value obtained by subtracting the value shown in the curve 305 from a value "1.0", i.e., a curve 304 is given to the other mapping direction as a blend function.

Note that, this blend function may be defined so as to blend two mapping directions such as shown in FIG. 28, or three mapping directions including the Cusp-direction mapping. Consequently, this blend function is defined by adjusting this so as to realize a mapping direction such as shown in FIG. 28.

Figure 29:
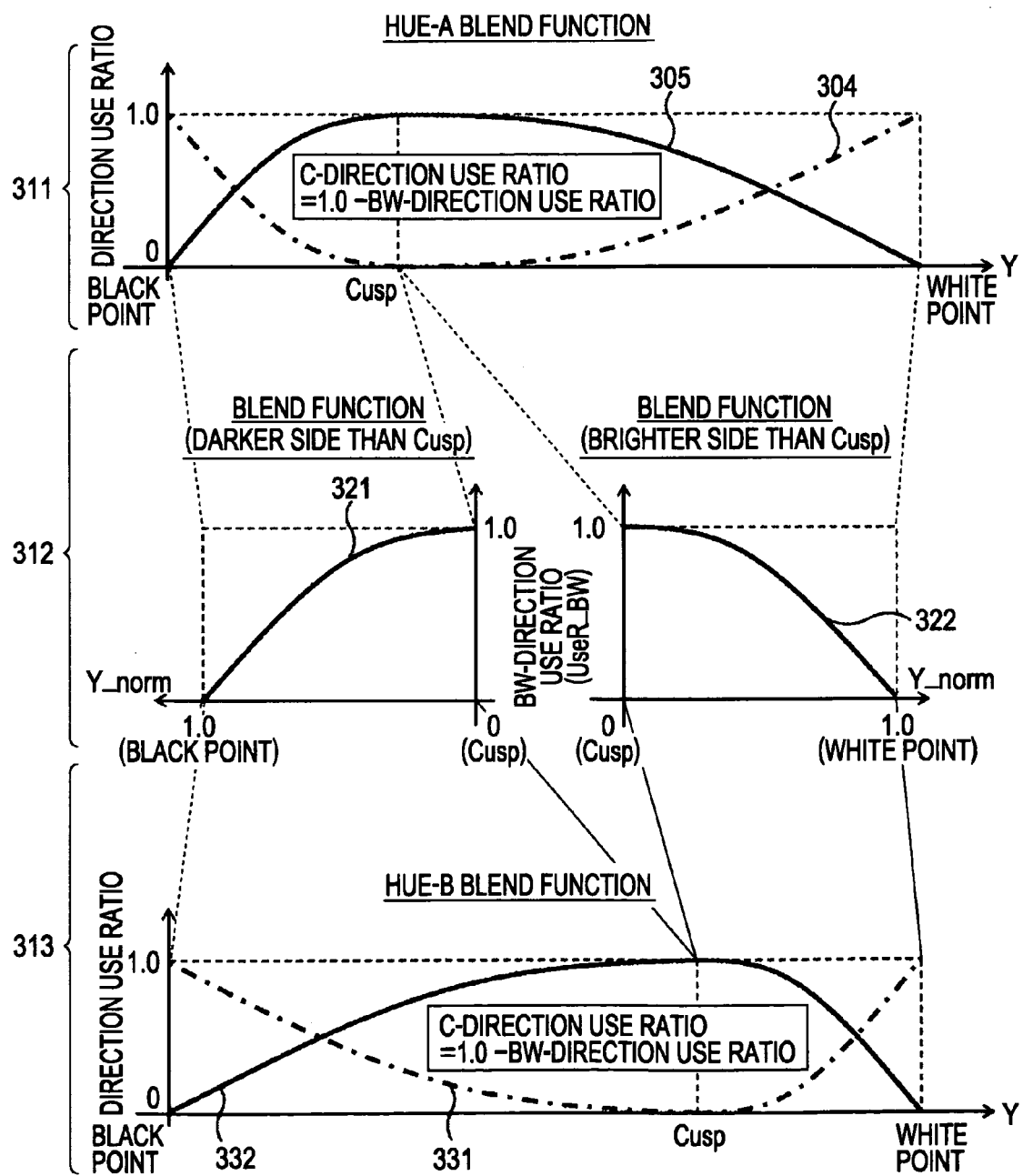
FIG. 29 is a diagram illustrating a blend function example.

With regard to the blend functions shown in the curves 304 and 305 such as shown in the upper stage 311 in FIG. 29, in reality, as shown in the middle stage 312 in FIG. 29, two types of blend functions (curves 321 and 322) are prepared wherein only a BW-direction use ratio is defined, for example. One (curve 322) is a function corresponding to a pixel to be processed on a brighter side than the Cusp point, and the other (curve 321) is a function corresponding to a pixel to be processed on a darker side than the Cusp point. Let us say that the horizontal axis of the blend function (graph) shown in the middle stage 312 represents luminance wherein the luminance of the Cusp point through a white point, the luminance of the Cusp point through a black point are normalized with 0.0 through 1.0, respectively. Note that a C-direction use ratio can be obtained by subtracting the BW-direction use ratio from 1.0.

Figure 30:
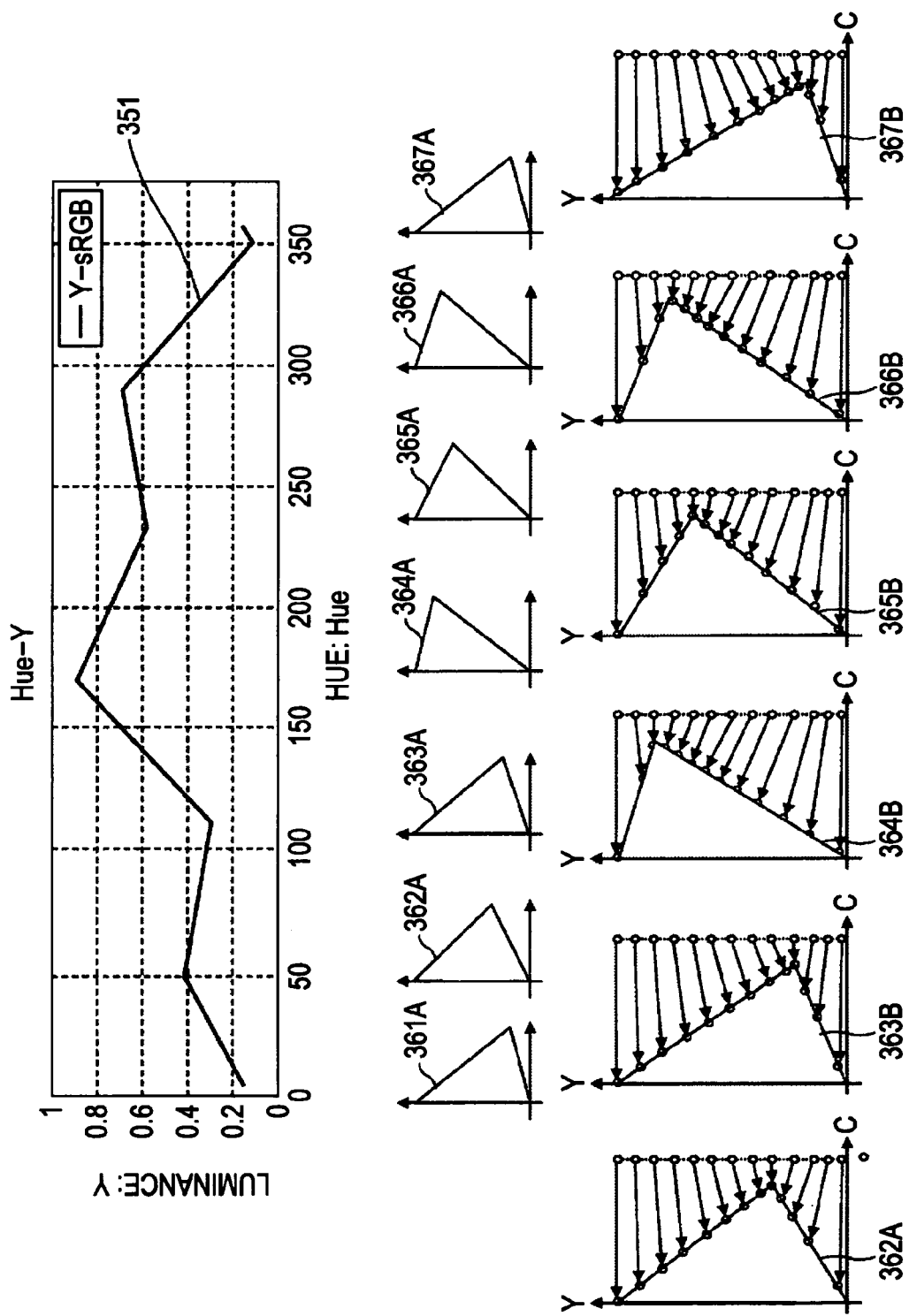
FIG. 30 is a diagram illustrating a mapping example.

The luminance and saturation of the Cusp point of a color gamut differ significantly depending on a hue, for example, such as shown in a curve 351 in the graph in the upper stage of FIG. 30, or the like, and the shape of the color gamut is also accordingly changed (color gamut 361A through 367A in the middle stage in FIG. 30). Accordingly, the blend function is desirable to be changed depending on a hue, and is defined such as shown in the middle stage 312 in FIG. 29, whereby the synthesis processing unit 125 can change the blend function appropriately for each hue in accordance with the luminance position of the Cusp point of the color gamut. For example, situations of the blend function at hues A and B wherein the luminance of the Cusp point is lower or higher are shown in the upper stage 311 and lower stage 313 in FIG. 29, respectively. There can be confirmed situations wherein the blend function is changed in accordance with the luminance of the Cusp point. Thus, upon changing the blend function, even if a color gamut shape is changed for each hue as shown in the middle stage in FIG. 30, such as color gamut 362B through color gamut 367B shown in the lower stage of FIG. 30, a direction wherein colors are eliminated around a white or black point, and a direction wherein colors are remained around the Cusp point, i.e., an ideal mapping direction can be realized.

As described above, let us say that the blend function is referenced by employing the luminance Yi of a pixel to be processed, and the obtained BW-direction use ratio is taken as UseR_BW. A final mapping point Pout(Yo, Co) can be calculated such as the following Expressions (7) and (8) by employing a C-direction mapping point (Yc, Cc), and BW-direction mapping point (Ybw, Cbw).

$$Yo = UseR\_BW \times Ybw + (1.0 - UseR\_BW) \times Yc \quad (7)$$

$$Co = UseR\_BW \times Cbw + (1.0 - UseR\_BW) \times Cc \quad (8)$$

Now, description will be back to FIG. 22. In step S127, the format conversion unit 126 converts the format of output content data, for example, from the YCH to YCC. The format conversion unit 126 employs the following Expressions (9) through (12) to convert the YC coordinates Pout(Yo, Co) of the obtained final mapping point from the YCH coordinates to YCC coordinates, and calculates the YCC coordinates Pout (Yo, Cbo, Cro) of the final mapping point.

$$Ho = Hi \quad (9)$$

$$Yo = Yo \quad (10)$$

$$Cbo = Co \times \cos(Ho) \quad (11)$$

$$Cro = Co \times \sin(Ho) \quad (12)$$

Upon the processing in step S127 being completed, the blend mapping processing is ended, the processing is returned to step S106 in FIG. 5, and the color gamut conversion processing is ended.

As described above, with the color gamut conversion, multiple mapping directions which differ mutually are blended with an appropriate ratio to determine a final mapping direction, whereby the color conversion device 100 can realize mapping direction control with higher flexibility, and can readily realize a more appropriate mapping direction according to a purpose.

Description has been made so far wherein three examples of fixed mapping directions are exemplified, and the mapping processing unit 114 selects two therefrom to synthesize these, but the fixed mapping direction may be another direction other than the above-mentioned directions. Also, the number of fixed mapping directions to be prepared may be four or more. Further, the mapping processing unit 114 may synthesize multiple fixed mapping directions with a combination other than the above-mentioned combinations. For example, the mapping processing unit 114 may select and synthesize three or more mapping directions.

Also, description has been made so far wherein mapping directions to be synthesized are selected by the mapping processing unit 114 depending on whether to perform the color gamut enlargement, but a selection condition of mapping directions may be any condition, and mapping directions to be selected according to each condition is arbitrary as long as there is no inconvenience. For example, with the flowchart in FIG. 22, description has been made wherein in a case in which the color gamut enlargement is not performed, the C-direction mapping and BW-direction mapping are selected and synthesized, but the present invention is not restricted to this, other mapping directions may be selected. For example, even in a case wherein the color gamut enlargement is not performed, the mapping processing unit 114 may select the C-direction mapping and Cusp-direction mapping according to a color gamut or the like of an output device.

That is to say, any kind of method may be employed as long as the method can select a color gamut appropriately in accordance with a predetermined condition, and also, conditions for selecting each method, and the number of directions to be synthesized are arbitrary.

Information processing system examples employing a color gamut conversion method such as described above are shown in FIGS. 31A and 31B.

Figure 31A:
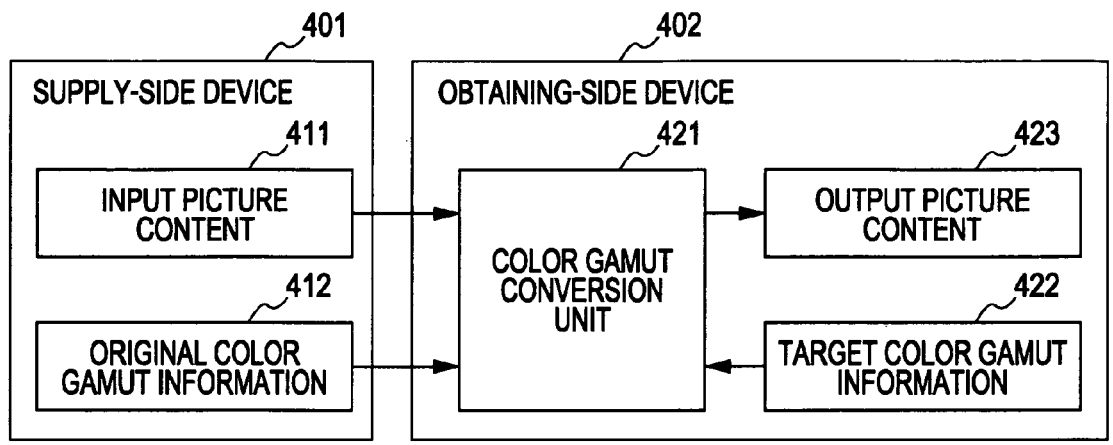
FIGS. 31A and 31B are block diagrams illustrating a configuration example of an information processing system to which an embodiment of the present invention has been applied.
Figure 31B:
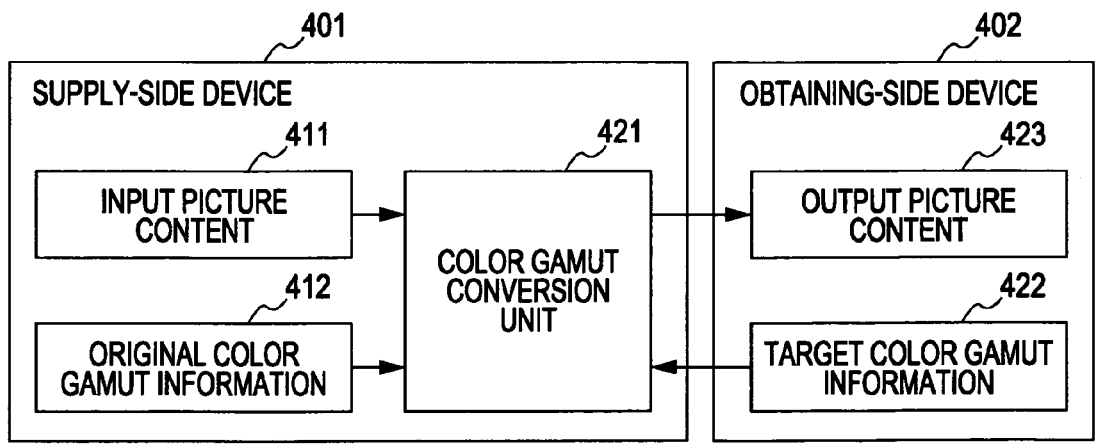

The respective information processing systems shown in FIGS. 31A and 31B are information processing systems to which an embodiment of the present invention has been applied. The color gamut conversion such as described above is performed in the case of picture content data being exchanged between multiple devices, or in the case of expecting picture content data to be exchanged between multiple devices. With regard to a combination of devices to perform exchange of picture content data, and the exchange method thereof, there can be conceived various combinations and various methods, but in FIGS. 31A and 31B, description will be made regarding a case wherein with an information processing system configured of a supply-side device 401 for supplying picture content data, and an obtaining-side device 402 for obtaining the picture content data, the color gamut conversion is performed, for convenience of explanation.

FIG. 31A illustrates an example in the case of performing the color gamut conversion at the obtaining-side device 402. As shown in FIG. 31A, the supply-side device 401 supplies input picture content data 411 and original color gamut information 412 to the obtaining-side device 402. The obtaining-side device 402 has the same function as that of the color gamut conversion device 100 in FIG. 3, includes a color gamut conversion unit 421 for performing similar processing, and has further obtained target color gamut information 422. The color gamut conversion unit 421 performs color gamut conversion based on the original color gamut information 412 supplied from the supply-side device 401, and the target color gamut information 422 to convert the input picture content data 411 supplied from the supply-side device 401 into output picture content data 423.

FIG. 31B illustrates another example in the case of performing the color gamut conversion at the supply-side device 401. As shown in FIG. 31B, the supply-side device 401 includes the color gamut conversion unit 421, and has obtained the input picture content data 411 and original color gamut information 412. Also, the obtaining-side device 402 supplies the target color gamut information 422 to the supply-side device 401. The color gamut conversion unit 421 performs color gamut conversion based on the original color gamut information 412, and the target color gamut information 422 supplied from the obtaining-side device 402 to convert the input picture content data 411 into output picture content data 423. The supply-side device 401 supplies the converted output picture content data 423 to the obtaining-side device 402.

As described above, the present invention may be applied to any kind of device as long as the device has the same configuration as that of the color gamut conversion device 100 in FIG. 1, and includes the color gamut conversion unit 421 for performing similar processing. That is to say, for example, as described with reference to FIG. 31, the color gamut conversion unit 421 can select an appropriate color gamut conversion method according to a device and conditions, and can perform color gamut conversion appropriately according to more various conditions.

The above-mentioned series of processing can be executed not only by hardware but also by software. In this case, for example, the above-mentioned series of processing may be configured as a personal computer such as shown in FIG. 32.

In FIG. 32, a CPU (Central Processing Unit) 501 of a personal computer 500 executes various types of processing in accordance with a program stored in ROM (Read Only Memory) 502, or a program loaded into RAM (Random Access Memory) 503 from a storing unit 513. Data or the like used by the CPU 501 to execute various types of processing is also stored in the RAM 503 as appropriate.

The CPU 501, ROM 502, and RAM 503 are mutually connected through a bus 504. An input/output interface 510 is also connected to the bus 504.

The input/output interface 510 is connected with an input unit 511 made up of a keyboard, mouse, and so forth, a display made up of CRT (Cathode Ray Tube), LCD (Liquid Crystal Display), or the like, an output unit 512 made up of a speaker and so forth, a storing unit 513 configured of a hard disk or the like, and a communication unit 514 configured of a modem or the like. The communication unit 514 performs communication processing through a network including the Internet.

The input/output interface 510 is also connected with a drive 515 as appropriate, on which a removable medium 521 such as a magnetic disk, optical disc, magneto-optical disk, semiconductor, or the like is mounted as appropriate, and a computer program read out therefrom is installed into the storing unit 513 as appropriate.

In a case wherein the above-mentioned series of processing is executed by software, a program making up the software thereof is installed from a network or recording medium.

The recording medium is not restricted to being configured of, separately from the device main unit such as shown in FIG. 32 for example, the removable medium 521 made up of a magnetic disk (including a flexible disk), optical disc (including CD-ROM (Compact Disc-Read Only Memory), DVD (Digital Versatile Disc)), magneto-optical disk (including MD (Mini Disc)), semiconductor memory, or the like, wherein a program to be distributed to a user is recorded, but also may be the ROM 502, a hard disk included in the storing unit 513, or the like, wherein a program to be distributed to a user in a state built into a device main unit beforehand is recorded.

Note that, with the present Specification, steps describing a program to be recorded in a recording medium include not only processing performed in time series along a described order but also processing executed in parallel or individually even though not necessarily performed in time series.

Also, with the present Specification, the term "system" represents the entirety of equipment configured of multiple devices.

Note that the configuration described above as a single device may be configured as multiple devices. Conversely, the configuration described above as multiple devices may be configured as a single device collectively. Also, a configuration other than the above-mentioned configuration may be added to the configuration of each device. Further, if the configuration and operation as the entire system are substantially the same, a part of the configuration of a certain device may be included in another device. That is to say, embodiments of the present invention are not restricted to the above-mentioned embodiment, and various changes can be made without departing from the essence and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device configured to perform color gamut conversion for compressing or enlarging the color gamut of image data, comprising:

selecting means configured to select a plurality of coordinate movement directions to be synthesized for determining the coordinate movement destination of a pixel to be processed during said color gamut conversion;

coordinate moving means configured to move the coordinates of said pixel to be processed in each of the selected plurality of directions; and synthesizing means configured to synthesize coordinate movement in the selected plurality of directions, wherein color gamut conversion is performed according to original color gamut information and target color gamut information, and wherein the original color gamut information and the target color gamut information is generated according to a cusp table which is rendered according to one of an index and xy chromaticity data of three primary colors, wherein said selecting means select a plurality of said coordinate movement directions based on regarding whether or not color gamut enlargement processing for enlarging a color gamut is performed as said color gamut conversion, wherein said selecting means select a saturation direction, and a rectilinear direction which connects a black point or white point and said pixel to be processed as said coordinate movement directions in a case wherein said color gamut enlargement processing is not performed, and select a saturation direction, and a rectilinear direction which connects a point, which is disposed on a luminance axis, having the same luminance value as that of the maximum saturation point, and said pixel to be processed as said coordinate movement directions in a case wherein said color gamut enlargement processing is performed.

* * * * *